(12) United States Patent
Nakagawa et al.

(10) Patent No.: US 8,308,370 B2
(45) Date of Patent: Nov. 13, 2012

(54) SEALING DEVICE FOR BEARING

(75) Inventors: Yoshitaka Nakagawa, Kashiwara (JP);
Youichi Numada, Toyota (JP); Hajime Tadumi, Higashiosaka (JP); Tsuyoshi Okumura, Yamatokoriyama (JP);
Kunihiro Yamaguchi, Nagoya (JP);
Ikuo Ito, Toyota (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 934 days.

(21) Appl. No.: 12/379,511

(22) Filed: Feb. 24, 2009

(65) Prior Publication Data
US 2009/0226124 A1    Sep. 10, 2009

(30) Foreign Application Priority Data

Feb. 25, 2008  (JP) ................. 2008-042816
Mar. 7, 2008   (JP) ................. 2008-058357
Mar. 7, 2008   (JP) ................. 2008-058359
Mar. 26, 2008  (JP) ................. 2008-080594

(51) Int. Cl.
F16C 33/76   (2006.01)
(52) U.S. Cl. ......... 384/484; 384/478; 384/480; 384/486
(58) Field of Classification Search .............. 384/477, 384/478, 479, 480, 481, 482, 484, 485, 486; 277/345, 353, 423–425, 433, 549, 551, 552, 277/558, 562, 571, 351, 559, 560, 926
See application file for complete search history.

(56) References Cited

U.S. PATENT DOCUMENTS

| 4,770,425 A * | 9/1988 | Colanzi et al. ............... 277/353 |
| 4,822,055 A * | 4/1989 | Hogan ........................ 277/558 |
| 2008/0106041 A1 | 5/2008 | Shibayama et al. |
| 2012/0068419 A1 * | 3/2012 | Berdichevsky et al. ...... 277/549 |

FOREIGN PATENT DOCUMENTS

| EP | 0388258 A | 9/1990 |
| JP | 11-230279 | 8/1999 |
| JP | 2001-050288 | 2/2001 |
| JP | 2002213467 A * | 7/2002 |
| JP | 2003097725 A * | 4/2003 |
| JP | 2003-194077 | 7/2003 |
| JP | 2005-140147 | 6/2005 |
| JP | 2005-282669 | 10/2005 |
| JP | 2005-325924 | 11/2005 |
| JP | 2007-211753 | 8/2007 |
| WO | WO 2006/064908 A1 | 6/2006 |

OTHER PUBLICATIONS

European Search Report dated May 29, 2009.
Notification of Reason for Refusal dated Feb. 7, 2012, in Japanese Patent Application No. 2008-080594 with English-language translation.

* cited by examiner

Primary Examiner — Phillip A Johnson
(74) Attorney, Agent, or Firm — McGinn IP Law Group, PLLC

(57) ABSTRACT

In a sealing device for a bearing, a sub-seal lip is configured such that a slide contact surface is formed like an annular band. As the rotation speed of the bearing increases, the width of the slide contact surface is reduced by a centrifugal force. Thus, sliding friction can effectively be minimized. The torque of the bearing can be prevented from increasing at high-speed rotation. Even when the centrifugal force increases somewhat, only reduction in the width of the slide contact surface is caused. Thus, a slide-contacted state can be maintained. Consequently, the problem of floating-up of the sub-seal lip from a slinger is difficult to occur.

13 Claims, 16 Drawing Sheets

SEALING DEVICE FOR BEARING

BACKGROUND OF THE INVENTION

This invention relates to a sealing device for a bearing.

Demands for size and weight reduction and interior space expansion of each automobile have forced automobiles to reduce the space of each engine room thereof. The size and weight reduction of electrical components and engine accessories have been more advanced. An electromagnetic clutch, a compressor, and an idler pulley for a car air-conditioner are not exceptions. However, a reduction in an output thereof due to the size reduction is inevitable. The reduction of the output of the electromagnetic clutch is compensated by acceleration thereof. Thus, the idler pulley is accelerated. Further, demands for enhancing quietness promote the sealing of the engine room and accelerate the raising of the temperature in the engine room. Consequently, these components need to bear high temperature. In addition, these components are often attached to a lower portion of the engine room. Accordingly, while the automobile runs, rainwater or muddy water is likely to be poured onto these components. Thus, high sealing properties are required by rolling bearings for these components.

A rolling bearing for the idler pulley is used in a manner in which an inner ring is provided at a non-rotating side, while an outer ring is provided at a rotating side. A sealing device for such a rolling bearing has a sliding seal portion configured so that a radially outer circumferential edge part thereof is fit to an inner circumferential side of an axial end portion of the outer ring relatively unrotatably therewith, and that a main rubber seal lip formed on a radially inner circumferential side thereof is slide-contacted with an outer circumferential side of an axial end portion of the inner ring. JP-A-2003-194077 discloses an apparatus configured so that a slinger (dust cover) to be fit to the inner ring provided at the non-rotating side is arranged so as to face an axially outer side of such a sliding seal portion thereby to restrain dust or the like from entering the inside of the bearing.

In recent years, operating conditions of automobiles have tended to become more severe. Higher waterproofing property has become desired by a bearing sealing device in consideration of cases where an amount of water to which an automobile is subjected is assumed to be more increased, e.g., where muddy water is splashed on the automobile, and where car wash water is sprayed onto the automobile, or cases where the automobile is used in a water-damaged or submerged state which is found in a recreational vehicle (RV) or the like. An apparatus disclosed in JP-A-2005-282669 aims at improving the sealing property by forming a sub-seal lip (axial lip), which protrudes toward the slinger and slides on the inner surface of this slinger, on an axially outer surface.

However, the apparatus disclosed in JP-A-2005-282669 has the following problems.

(1) A sub-seal lip is added to the apparatus in addition to a main seal lip. Thus, frictional sliding parts between the inner and outer rings are increased. Consequently, bearing torque is increased. Accordingly, there is a fear that this may be a hindrance to high-speed rotation performance. More particularly, when an axially exposed thread of the sub-seal lip is increased to enhance the waterproofing property, the sliding friction of the seal lip is further increased. Thus, the problem of increase in torque becomes marked.

(2) In the apparatus disclosed in JP-A-2005-282669, a distal end surface of the sub-seal lip is formed to be flat. The sub-seal lip is slide-contacted with the slinger on the distal surface thereof by being radially outwardly inclined. According to such a structure, when the sub-seal lip is elastically deformed by a centrifugal force due to the rotation of the outer ring, the distal end surface thereof is easily floated up from the slinger. Even in a relatively low speed rotation state, the sealing ability of the apparatus is easily deteriorated. More specifically, in a case where a vehicle runs while being submerged in a river, even when the running speed of the vehicle is low, the sealing property of the sub-seal lip is easily impaired. This is likely to lead to a disadvantage that water filled around the bearing rapidly infiltrates thereinto.

Further, sealing devices for a bearing are disclosed also in, e.g., JP-A-2005-325924, and JP-A-11-230279.

SUMMARY OF THE INVENTION

An object of the invention is to provide a sealing device for a bearing, which can appropriately self-control the sealing property of the bearing according to the rotation speed thereof and can achieve both of higher sealing property at low-speed rotation and lower running torque at high-speed rotation.

To solve the aforementioned problems, the present invention provides the following arrangements.

(1) A sealing device for a radial bearing including an inner ring, an outer ring and rolling elements interposed between the inner and outer rings, the sealing device comprising:

a slinger which includes a radially inner circumferential edge portion fit to the inner ring and a body plate for axially obstructing an annular opening formed between the inner and outer rings; and a sliding seal portion which includes:

an axial base surface facing the body plate of the slinger with forming an axial seal clearance between the axial base surface and the body plate at an axially inner side of the slinger;

a radially outer circumferential edge which is formed at an radially outer end of the axial base surface and is fit to the outer ring;

a main seal lip which is formed at an radially inner end of the axial base surface and is slide-contacted with an outer side of an axial end portion of the inner ring; and a sub-seal lip which extend from the axial base surface in the axial seal clearance so that a slide contact edge at a distal end portion of the sub-seal lip is slide-contacted with the body plate, wherein the sub-seal lip abuts against the inner surface of the body plate by being elastically deformed such that a slide contact area between the slide contact edge and the inner surface of the body plate is an annular band-like shape;

wherein the sub-seal lip is elastically deformed so as to be inclined toward the axial base surface by a centrifugal force generated due to rotation of the outer ring, and wherein a radial width of the annular band-like shape of the slide contact area is reduced toward the slide contact edge with increase in the centrifugal force.

(2) The sealing device according to (1), wherein a lip length determined as a dimension to the slide contact edge from a starting position of inclination of the lip is larger than a lip base end thickness determined as a radial dimension of an intersection surface between the sub-seal lip and the axial base surface.

(3) The sealing device according to (1), wherein the distal end portion of the sub-seal lip is formed so as to be a flat surface or into a stepped shape.

(4) The sealing device according to (1), wherein the distal end portion of the sub-seal lip is shaped so that a width of the distal end portion is acutely tapered toward the distal end of the sub-seal lip in a cross-section including an axis line of rotation of the bearing.

(5) A sealing device for a radial bearing including an inner ring, an outer ring and rolling elements interposed between the inner and outer rings, the sealing device comprising:

a slinger which includes a radially inner circumferential edge portion fit to the inner ring and a body plate for axially obstructing an annular opening formed between the inner and outer rings; and a sliding seal portion which includes:

an axial base surface facing the body plate of the slinger with forming an axial seal clearance between the axial base surface and the body plate at an axially inner side of the slinger;

a radially outer circumferential edge which is formed at an radially outer end of the axial base surface and is fit to the outer ring;

a main seal lip which is formed at an radially inner end of the axial base surface and is slide-contacted with an outer side of an axial end portion of the inner ring; and a sub-seal lip which extend from the axial base surface in the axial seal clearance, wherein an annular branch seal lip is formed at a radially midway position on a radially inner circumferential surface of the sub-seal lip so as to protrude toward an inner surface of the slinger; and wherein when in a non-rotating state of the outer ring, a distal end of the branch seal lip is slide-contacted with the inner surface of the body plate of the slinger, and a distance between the inner surface of the body plate and a radially inner circumferential surface of a distal end portion of the sub-seal lip is gradually reduced toward a distal end of the sub-seal lip.

(6) The sealing device according to (5), wherein, in the non-rotating state of the outer ring, a clearance constituting a labyrinth seal is formed between the radially inner circumferential end edge of the distal end portion and the inner surface of the body plate.

(7) The sealing device according to (5), wherein, in the non-rotating state of the outer ring, a distal end edge of the distal end portion of the sub-seal lip is slide-contacted with the inner surface of the slinger, together with the branch seal lip, across an annular groove formed by the radially inner circumferential surface and the radially outer circumferential surface of the branch seal lip.

(8) The sealing device according to (7), wherein the sub-seal lip is elastically deformed in a radially inward direction due to a negative pressure generated at a space where rolling elements are arranged, and the distal end portion of the sub-seal lip approaches and moves apart from the inner surface of the body plate according to the negative pressure in a swinging manner using the branch seal lip as a fulcrum point.

(9) The sealing device according to (7), wherein a slide contact edge which is slide-contacted with an axially inner surface of the body plate is formed at the distal end portion of the sub-seal lip, the sub-seal lip abuts against the inner surface of the body plate by being elastically deformed such that a slide contact area between the slide contact edge and the inner surface of the body plate is an annular band-like shape;

the sub-seal lip is elastically deformed so as to be inclined toward the axial base surface by a centrifugal force generated due to rotation of the outer ring, and a radial width of the annular band-like shape of the slide contact area is reduced toward the slide contact edge with increase in the centrifugal force.

(10) A sealing device for a radial bearing including an inner ring, an outer ring and rolling elements interposed between the inner and outer rings, the sealing device comprising:

a slinger which includes a radially inner circumferential edge portion fit to the inner ring and a body plate for axially obstructing an annular opening formed between the inner and outer rings; and a sliding seal portion which includes:

an axial base surface facing the body plate of the slinger with forming an axial seal clearance between the axial base surface and the body plate at an axially inner side of the slinger, a radially outer circumferential edge which is formed at an radially outer end of the axial base surface and is fit to the outer ring;

a main seal lip which is formed at an radially inner end of the axial base surface and is slide-contacted with an outer side of an axial end portion of the inner ring; and a sub-seal lip which extend from the axial base surface in the axial seal clearance so that the sub-seal lip is slide-contacted with the body plate, wherein a protrusion or a concave groove is formed in a seal sliding surface of the slinger on which the sub-seal lip is slide-contacted.

(11) A sealing device for a radial bearing including an inner ring, an outer ring and rolling elements interposed between the inner and outer rings, the sealing device comprising:

a slinger which includes a radially inner circumferential edge portion fit to the inner ring and a body plate for axially obstructing an annular opening formed between the inner and outer rings; and a sliding seal portion which includes:

an axial base surface facing the body plate of the slinger with forming an axial seal clearance between the axial base surface and the body plate at an axially inner side of the slinger;

a radially outer circumferential edge which is formed at an radially outer end of the axial base surface and is fit to an axial end portion of the outer ring;

a main seal lip which is formed at an radially inner end of the axial base surface and is slide-contacted with an outer side of an axial end portion of the inner ring; and a conical sub-seal lip which extend from the axial base surface in the axial seal clearance so that the sub-seal lip increases in diameter toward a radially outside of the bearing and a slide contact edge at a distal end portion of the sub-seal lip is slide-contacted with the body plate, wherein a plurality of plate-like fins are formed on a base portion of the sub-seal lip so as to be circumferentially spaced apart from one another and as to extend between the sub-seal lip and the axial base surface of the sliding seal portion, wherein air between the sliding seal portion and the slinger is radially outwardly sent out by action of rotation of each fin due to rotation of the sliding seal portion, and wherein a pressure of the air between the sliding seal portion and the slinger is made to be higher than a pressure of outside air so as to cause a pressure difference therebetween, thereby restraining a foreign material from infiltrating into between the sliding seal portion and the slinger from an exterior of the bearing.

(12) The sealing device according to (11), wherein the fins are formed so as to be inclined with respect to a radial direction so that a foreign material entering between the axial base surface of the sliding seal portion and the sub-seal lip in response to a rotation of the sliding seal portion is discharged outwardly in a radial direction of the bearing.

DETAILED DESCRIPTION OF PREFERRED EMBODIMENTS

First Embodiment

Figure 1:
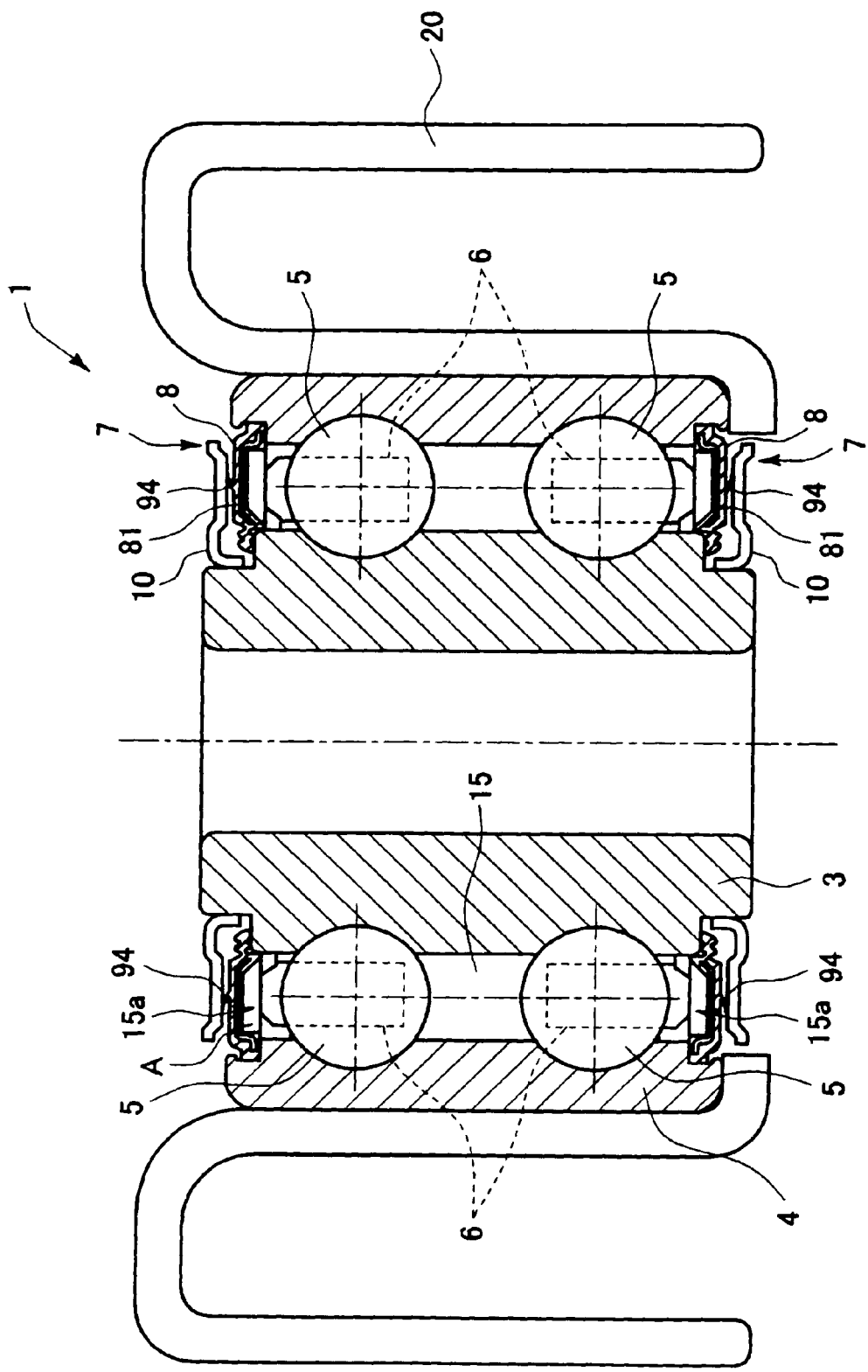
FIG. 1 is a cross-sectional view illustrating a bearing for an idler pulley, to which a sealing device for a bearing according to a first embodiment of the invention is applied.

Hereinafter, embodiments of the invention are described with reference to the accompanying drawings. FIG. 1 is a cross-sectional view illustrating an embodiment of a bearing for an idler pulley, to which a sealing device for a bearing according to a first embodiment of the invention is applied. A bearing 1 is used for rotationally supporting an idler pulley for an automobile. The bearing 1 is formed to be a double row deep groove ball bearing (radial bearing) to be used such that an inner ring 3 is provided at a non-rotating side, and that an outer ring 4 is provided at a rotating side. Balls 5 serving as rolling elements are arranged in a rolling element arranging space 15 formed between the inner ring 3 and the outer ring 4 while the circumferential arrangement integrals thereof are regulated by retainers 6 at the respective rows. A pulley 20 is concentrically fit onto the outer circumferential surface of the outer ring 4.

In the bearing 1, sealing devices 7 are provided in annular openings 15a that appear at both axial ends of the rolling element arranging space 15, respectively. Any of the sealing devices 7 for a bearing have just the same structure. A main part of each of the sealing devices 7 includes an inner ring side slinger 10 and a sliding seal portion 8.

Figure 2:
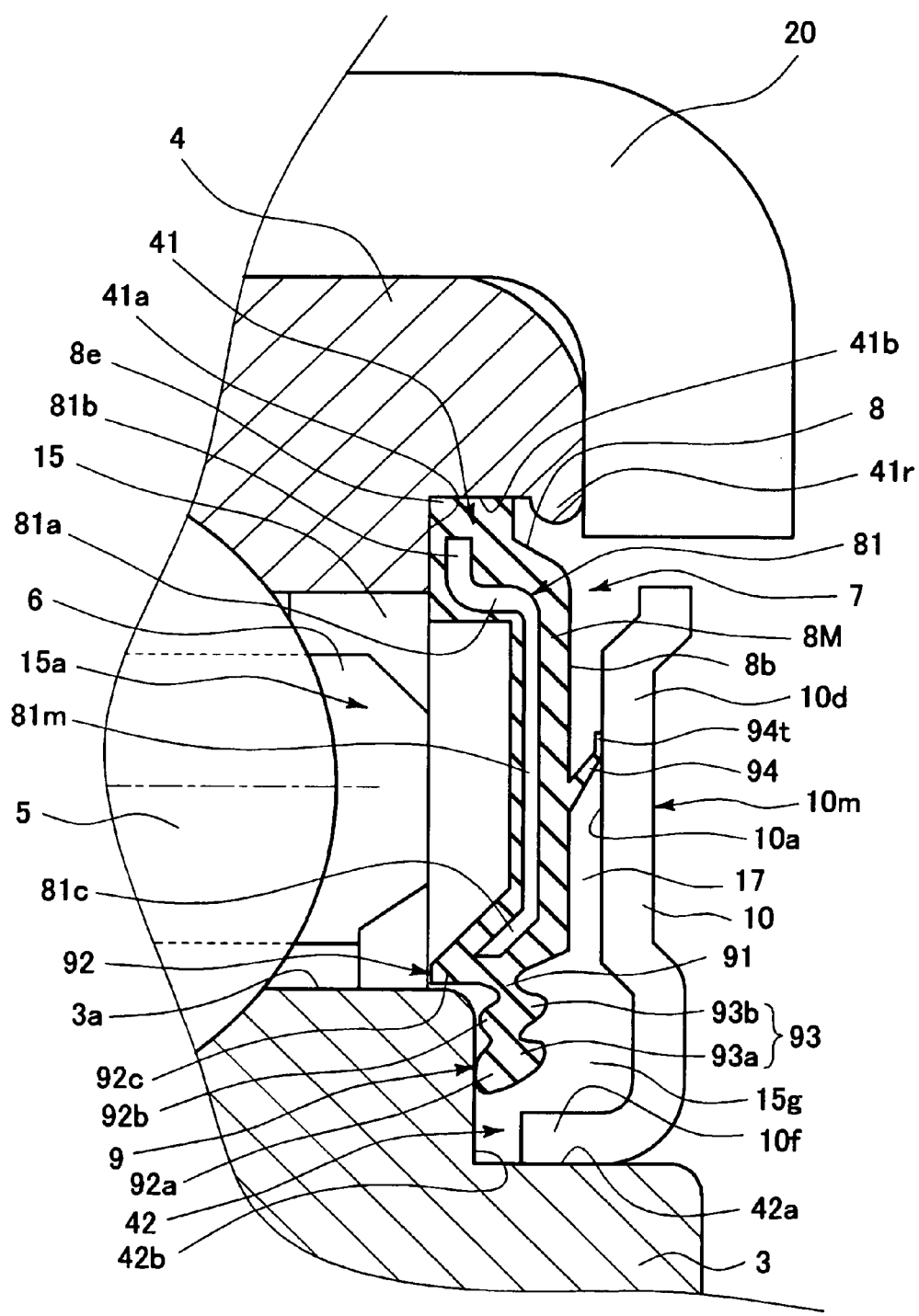
FIG. 2 is an enlarged cross-sectional view illustrating a sealing device portion for a bearing, which is illustrated in FIG. 1.

FIG. 2 is an enlarged and detail cross-sectional view illustrating one of the sealing devices 7 for a bearing. The slinger 10 is disposed so as to axially obstruct the annular openings 15a of the rolling element arranging space 15 formed between the inner ring 3 and the outer ring 4. A radially inner circumferential edge portion of the slinger 10 is fit to an axial end portion of the inner ring 3 relatively unrotatably therewith. More specifically, the slinger 10 includes a body plate 10m arranged concentrically with the inner ring 3 such that a thickness direction thereof coincides with the axial direction thereof, and a cylindrical portion 10f formed integrally with the body plate 10m so as to axially inwardly protrude from an opening inner circumferential edge of the body plate 10m. A radially midway section portion of the body plate 10m expands axially inwardly from both end section portions thereof and serves as an annular reinforcing expansion portion 10d whose inner surface 10a is flattened. Further, an annular inner-ring-side step portion 42 is formed on an outer circumferential edge portion of the axial end surface of the inner ring 3. A cylindrical portion 10f of the slinger 10 is press-fit into an inner circumferential surface 42a of the inner-ring-side step portion 42.

Next, the sliding seal portion 8 is arranged so as to face the slinger 10 such that an axial seal clearance 17 is formed at the axially inner side of the slinger 10. The radially outer circumferential edge of the sliding seal portion B is fit to the axial end portion of the outer ring 4 relatively unrotatably therewith. A main seal lip 9 made of an elastic polymer material, which is slide-contacted with the outer side of an axial end portion of the inner ring 3, is formed on the radially outer circumferential edge side of the sliding seal portion 8. A sub-seal lip 94 made of an elastic polymer material is formed using a surface opposed to the slinger 10 as an axial base surface 8b so as to be inclined radially outwardly away from the axial base surface 8b while crossing the axial seal clearance 17. A distal end portion of the sub-seal lip 94 is slide-contacted with an axially inner surface 10a (constituting the inner surface of the aforementioned reinforcing expansion portion 10d) of the slinger 10.

More specifically, the sliding seal portion 8 includes a seal mandrel 81 arranged so that the thickness direction of the seal mandrel 81 coincides with an axial direction thereof, and a seal body 8M made of an elastic polymer material, which covers a plate surface at the axially outer side of the seal mandrel 81. The main seal lip 9 is formed integrally with the seal body 8M so as to extend radially inwardly from a radially inner circumferential edge of the seal mandrel 81. Further, the sub-seal lip 94 is formed integrally with the seal body 8M using the axially outer surface of the seal body 8M as the axial base surface 8b.

The seal mandrel 81 includes an annular body plate 81m arranged such that the thickness direction thereof coincides with the axial direction thereof, a cylindrical wall portion 81a formed integrally with the body plate 81m so as to protrude axially inwardly from an outer circumferential edge of the body plate 81m, and a flange portion 81b extending radially outwardly from the axial edge of the cylindrical wall portion 81a. The outer circumferential edge portion of the seal body 8M constitutes an annular cross-sectionally square-shaped fitting lip 8e formed so as to enfold the cylindrical wall portion 81a and the flange portion 81b. On the other hand, a reinforcing bent-back portion 81c is formed by axially inwardly and obliquely bending back an inner circumferential edge side portion of the seal mandrel 81. The seal body 8M radially inwardly extends while wrapping the reinforcing bent-back portion 81c, thereby to constitute the main seal lip 9.

An inner circumferential portion of an axially end surface of the outer ring 4 is cut into a circumferentially stepped shape to thereby form an annular outer-ring-side cutout portion 41. The fitting lip 8e is press-fit into the outer-ring-side cutout portion 41 so as to be closely contacted with a bottom surface 41a and an inner circumferential surface 41b thereof. Incidentally, a slip-off preventing rib 41r is formed on an axial edge portion at an opened side of the inner circumferential surface 41b of the outer-ring-side cutout portion 41 so as to circumferentially protrude therefrom. The fitting lip 8e is fit into the outer-ring-side cutout portion 41 by elastically overriding the slip-off rib 41r.

The main seal lip 9 includes base portions 91 extending radially outwardly from the seal body 8M, and an inner lip 92 extending axially inwardly from the base portion 91. The inner lip 92 includes an inner slide contact lip 92a that extends from the base portion 91 provided at a radially inner side toward the bottom surface 42b of the inner-ring-side step portion 42 and slide-contacts the bottom surface 42b, an inner auxiliary lip 92b extending from the base portion 91 provided at a radially outer side toward the bottom surface 42b of the inner-ring-side step portion 42, and an axial lip 92c extending from the base portion 91 provided at the radially outer side toward an axially inner side. Outer lips 93 include a first outer lip 93a provided in the base portion 91 at the substantially same position as the radial position of the inner slide contact lip 92a so as to extend axially outwardly, and a second outer lip 93b provided in the base portion 91 at the substantially same position as the radial position of the inner auxiliary lip 92b so as to extend axially outwardly.

The inner lip 92 is configured so that only the inner slide contact lip 92a is slide-contacted with the bottom surface 42b of the inner-ring-side step portion 42, while the inner auxiliary lip 92b is not slide-contacted therewith. After the bearing 1 is started to be used, the inner slide contact lip 92a is worn by a certain amount. Thus, the inner auxiliary lip 92b is brought into slide contact with the bottom surface 42b of the inner-ring-side step portion 42. Further, the axial lip 92c and the outer circumferential surface 3a of the inner ring 3 constitute a labyrinth seal. Incidentally, in order to perform slide lubrication of each seal lip, grease is made to adhere to the bottom surface 42b of the inner-ring-side step portion 42 and the inner surface 10a of the slinger 10.

Figure 3:
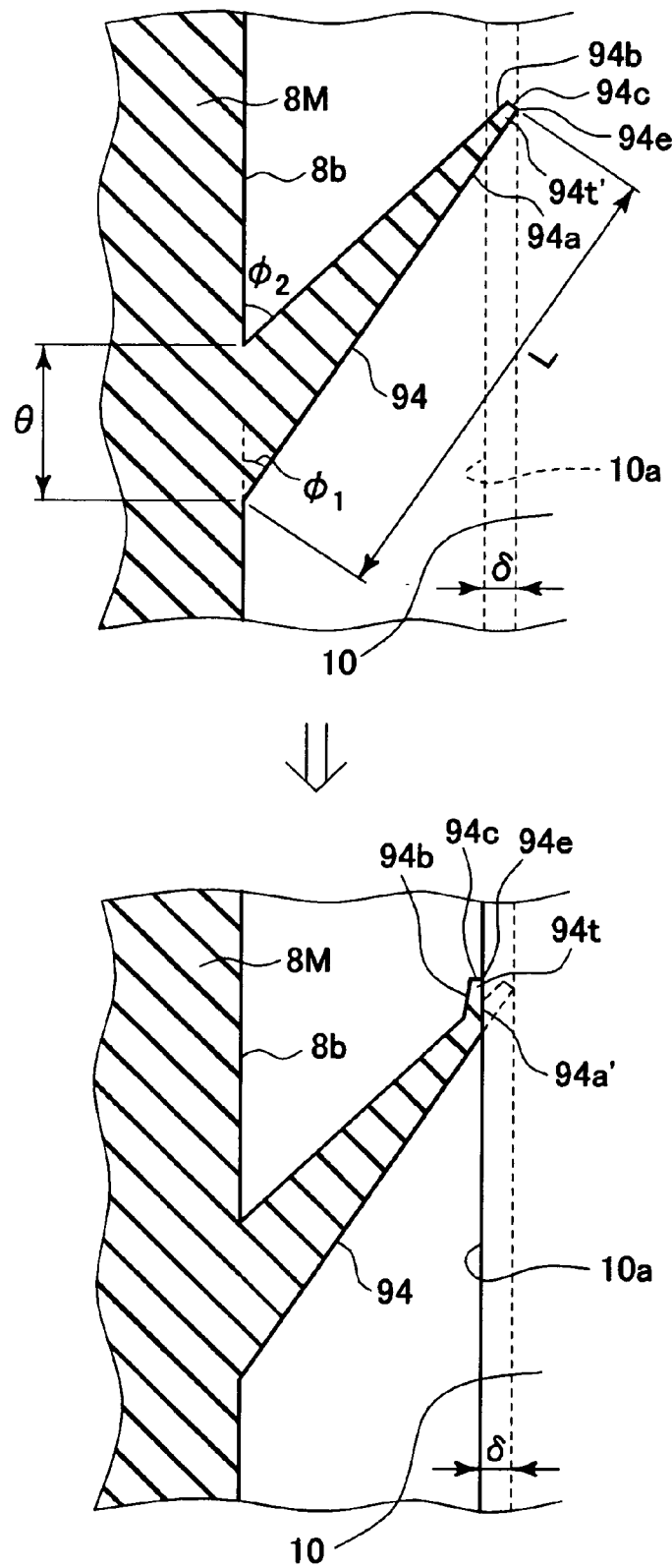
FIG. 3 is an enlarged cross-sectional view illustrating both of a non-deformed state and a mounted state of a sub-seal lip of the sealing device for a bearing device illustrated in FIG. 2.
Figure 6:
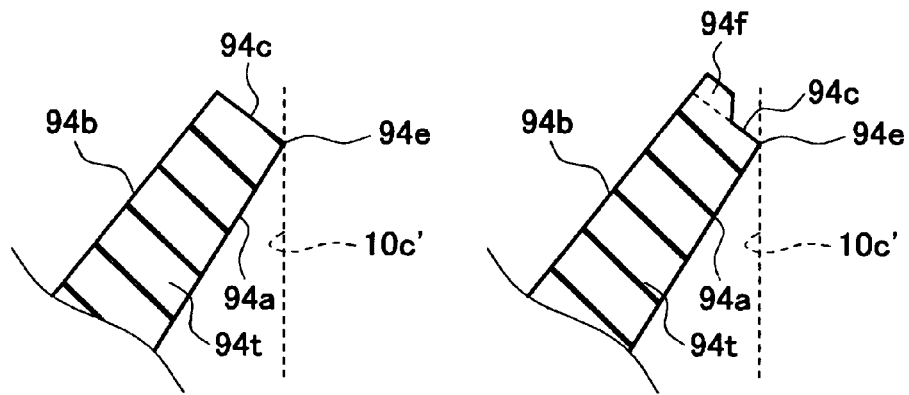
FIG. 6 is an enlarged cross-sectional view illustrating a first example of the shape of a distal end of the sub-seal lip.

Next, FIG. 3 is an enlarged cross-sectional view illustrating the sub-seal lip 94. FIG. 6 is a further-enlarged cross-sectional view illustrating a distal end portion 94t at the slide contact side of the sub-seal lip 94. The sub-seal lip 94 is such that a slide contact edge 94e is formed at a position at which a distal end surface 94c of the sub-seal lip end portion 94t intersects with a radially inner circumferential surface 94a. An upper part of FIG. 3 illustrates the sub-seal lip 94 in a virtual non-deformed state in which the slinger 10 is omitted. In the bearing put into an actually assembled state, the sub-seal lip 94 is always elastically deformed by the slinger 10 in a non-rotating condition of the bearing. However, in a case where the slinger 10 is removed, the shape of the sub-seal lip 94 in the non-deformed state can be confirmed. The slide contact edge 94e is positioned axially outer than the inner surface 10a of the slinger 10 by a certain distance when the non-deformed state occurs (in addition, the non-rotating condition of the bearing simultaneously occurs). An amount, by which the slide contact edge 94e is extended axially from the inner surface of the slinger 10, in the case of estimating in the non-deformed state determines an axially exposed thread 8 of the sub-seal lip 94.

In a case where the slinger 10 is actually arranged by being brought into the non-deformed state illustrated in the upper part of FIG. 3, the sub-seal lip 94 is configured such that the distal end portion 94t of the sub-seal lip 94 abuts against the inner surface 10a thereof by employing the side of the slide contact edge 94e as a side from which the distal end portion 94t starts abutting thereagainst and by being elastically deformed while forming an annular band-like slide contact surface 94a' in the radially inner circumferential surface 94a, as illustrated in a lower part of FIG. 3. Incidentally, the distal end surface 94c does not abut against the slinger 10.

Figure 4:
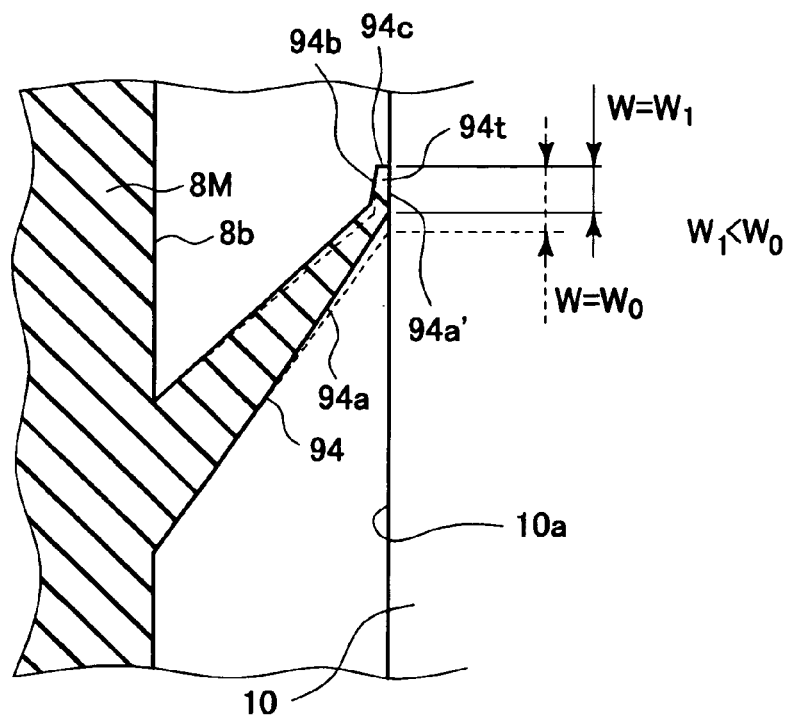
FIG. 4 is an explanatory view illustrating an operation of the sub-seal lip.

When a centrifugal force due to the rotation of the outer ring 4 acts thereon in this state, the sub-seal lip 94 is radially outwardly and elastically deformed, as illustrated in FIG. 4, that is, the sub-seal lip 94 is elastically deformed so as to be inclined toward the side of the axial base surface 8b. An amount of inclination of the sub-seal lip 94 increases with increase in the centrifugal force. When estimated in the non-deformed state illustrated in FIG. 3, the axially exposed thread 6 of the sub-seal lip 94 decreases with increase in the amount of inclination of the sub-seal lip 94. Then, as indicated by dashed lines in FIG. 4, while a position at which the slide contact edge 94e abuts thereon is maintained, the radially inner circumferential surface 94a of the distal end portion 94t of the sub-seal lip 94 is turned out radially from a side opposite to this position. An annular band-like slide contact surface 94a' formed on the slinger 10 is adapted such that as the centrifugal force increases, a radial width W is reduced toward the slide contact edge 94e. That is, the radial width W0 of the slide surface 94a', in a state in which the outer ring 4 is non-rotated, and the radial width W1 thereof, in a state in which the outer ring 4 rotates and in which a centrifugal force acts, satisfy the following condition: W1<W0.

Consequently, the sub-seal lip 94 implements the function of self-controlling the sealing property and the running torque of the bearing according to the rotation speed of the outer ring 4. That is, the slide contact surface 94a' of the sub-seal lip 94 is formed like an annular band. As the rotation speed of the outer ring 4 increases, the width of the slide contact surface 94a' is radially reduced due to the centrifugal force. Accordingly, the sliding friction can effectively be minimized. The torque of the bearing can be prevented from increasing at high-speed rotation.

Even when the centrifugal force increases somewhat, only reduction in the width of the slide-contact surface 94a' is caused. Thus, the sub-seal lip 94 can maintain a slide-contacted state. The problem of the floating-up of the sub-seal lip 94 from the slinger 10 is difficult to occur. Further, as illustrated in FIG. 6, the sub-seal lip 94 is put into line contact with the inner surface of the slinger from a slide contact edge 94e formed in the boundary between the distal end surface 94c and the radially inner circumferential surface 94a thereof, instead of bringing the sub-seal lip 94 into plane contact with the inner surface of the slinger in the direction of a normal line thereto from a distal end portion thereof. Thus, as illustrated in the lower part of FIG. 3, the annular band-like slide contact surface 94a' is formed while the sub-seal lip 94 is elastically deformed. Consequently, even when the width of the slide contact surface 94a' is somewhat reduced due to the centrifugal force, the sealing ability is difficult to be impaired. For example, in a case where a vehicle runs while being submerged in a river, the width of the slide contact surface 94a' becomes sufficiently wide with reduction in the centrifugal force. Consequently, the sealing property of the sub-seal lip 94 can be enhanced. Accordingly, occurrence of the problem of filtration of water filled around the bearing thereinto can effectively be prevented.

Figure 5:
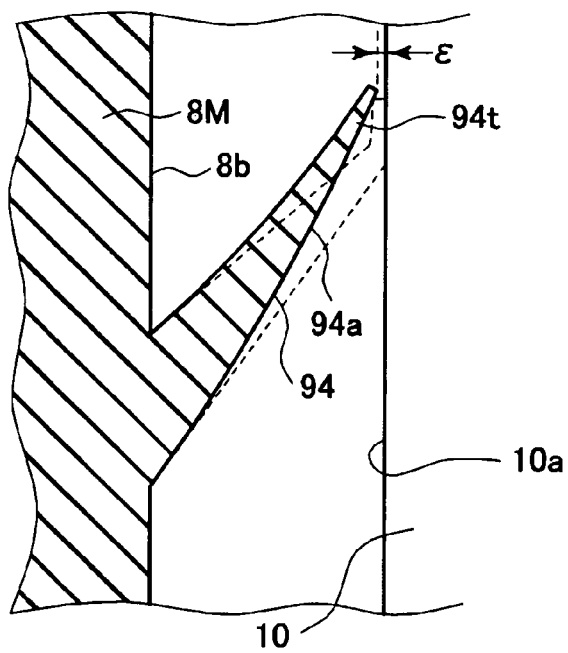
FIG. 5 is an explanatory view illustrating an operation performed by the sub-seal lip when a centrifugal force is more increased.

Meanwhile, when the rotation speed of the outer ring 4 increases, the effect of sputtering water drops or the like, which fall on the outer ring 4, by a centrifugal force thereof is caused. Thus, even when the width of the slide contact surface 94a' is reduced, the effect of preventing infiltration of water or the like into a bearing can be assured above a certain level. Further, in a high-speed rotation state in which the effect of sputtering water drops or the like by a centrifugal force of the outer ring 4 becomes substantially large, the distal end portion 94t of the sub-seal lip 94 can be floated up from the slinger 10, as illustrated in FIG. 5. At that time, preferably, the aforementioned exposed thread δ is adjusted such that the width ε of the clearance formed between the slide contact edge 94e and the inner surface 10a of the slinger 10 at the maximum rotation speed, which is assumed when the bearing is actually used, is sufficient for constituting a labyrinth seal, On the other hand, in the case of occurrence of a situation in which the internal pressure of the rolling element arranging space 15 is negative, the sub-seal lip 94 is radially inwardly and elastically deformed by the aforementioned negative pressure suction force. Consequently, the radial width W of the annular band-like slide contact surface 94a' formed between the end portion 94t of the sub-seal lip 94 and the slinger 10 can be increased with increase in the negative pressure. Accordingly, the sealing ability at the time of generating the negative pressure can considerably be enhanced. That is, the radial width W' of the slide contact surface 94a' in a case where the negative pressure does not act, and the radial width W" thereof in a case where the negative pressure acts, satisfy the following condition: W">W'.

Hereinafter, the sub-seal lip 94 is described more detail. In order to make the smooth progress of the elastic deformation in which the sub-seal lip 94 is inclined toward the side of the axial base surface 8b when a centrifugal force acts, in the aforementioned non-deformed state as illustrated in an upper part of FIG. 3, a lip length L determined as a dimension to the slide contact edge 94e from a starting position of, inclination of the sub-seal lip 94 from the axial base surface 8b in the direction of a generatrix of the radially inner circumferential surface 94a is adjusted to be larger than a lip base end thickness θ determined as a radial dimension of an intersection surface between the lip and the axial base surface 8b.

Figure 7:
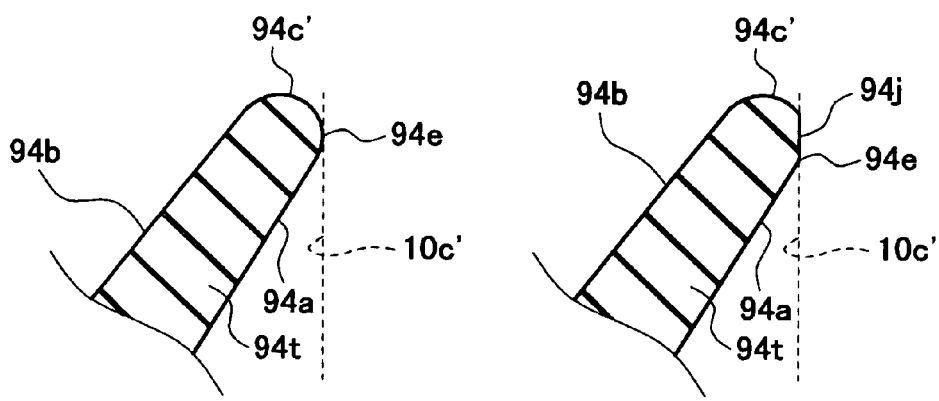
FIG. 7 is an enlarged cross-sectional view illustrating a second example of the shape of a distal end of the sub-seal lip.
Figure 8:
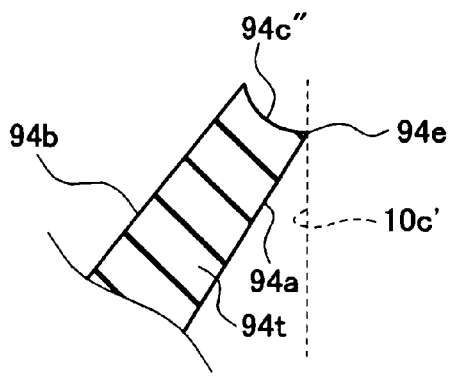
FIG. 8 is an enlarged cross-sectional view illustrating a third example of the shape of a distal end of the sub-seal lip.

Further, the distal end surface 94c of the sub-seal lip 94 is formed to be a flat surface, as illustrated in a left-side part of FIG. 6. Consequently, the sub-seal lip 94 is configured such that the slide contact edge 94e formed at the position of intersection between the radially inner circumferential surface 94a and the distal end surface 94c can maintain an appropriate stiffness and can be sharpened, and that the effect of improving the sealing property due to the line contact can be enhanced. Incidentally, as illustrated in a right-side part of FIG. 6, the distal end surface 94c of the sub-seal lip 94 can be formed into a stepped shape. More specifically, a protrusion portion 94f is formed at a side opposite to the side on which the slide contact edge 94e of the distal end surface 94c is formed. In addition, as illustrated in FIG. 7, the distal end surface 94c can be formed to be a convex curved distal end surface 94c'. Alternatively, as illustrated in FIG. 8, the distal end surface 94c can be formed to be a concave curved distal end surface 94c". The sub-seal lip 94 is formed into a shape of a rotating body with respect to the axis line of rotation of the bearing. In addition, in a case where the sub-seal 94 has a distal end surface 94c' formed into a convex curved surface shape illustrated in FIG. 7, the slide contact edge 94e is defined as follows. That is, when considering a cross-section including an axis line of rotation of the bearing in the non-deformed state, as illustrated in FIG. 6, a tangential line 10c' (spatially corresponding to a cylindrical surface) circumscribing an outline of the distal end portion 94t of the sub-seal lip 94 including the distal end surface 94c is drawn in parallel to the inner surface of the slinger 10. It is considered that each point (spatially corresponding to a circle) of contact between the tangential line 10c' and the outline at that time constitutes the aforementioned slide contact edge 94e. Incidentally, as illustrated in a right-side part of FIG. 7 by being added thereto, in a case where chamfering is performed at the position of the slide contact edge, the distal end portion of the sub-seal lip is slide-contacted therewith on a band-like surface 94j constructed such that the chamfered segment has a constant width. In this case, an edge positioned at the radially inner side of the band-like surface 94j is regarded as the slide contact edge 94e.

Figure 11:
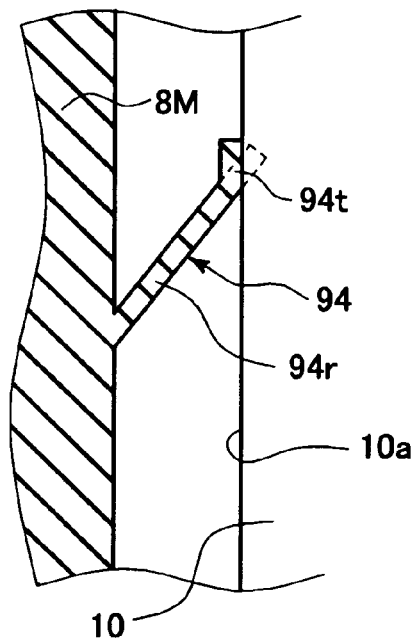
FIG. 11 is a cross-sectional view illustrating another example of modification of the sub-seal lip.
Figure 12:
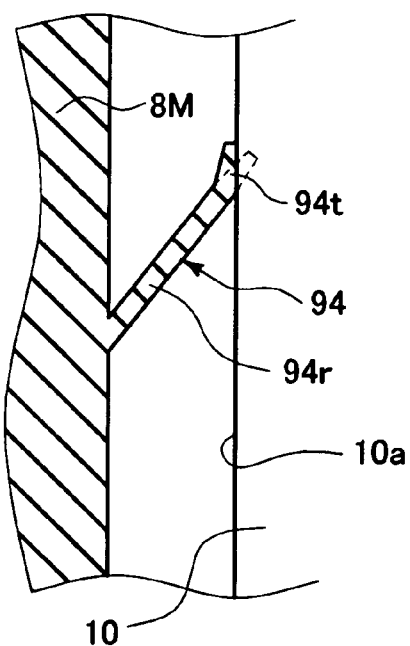
FIG. 12 is a cross-sectional view illustrating still another example of modification of the sub-seal lip.

Turning back to FIG. 3, the distal end portion 94t of the sub-seal lip 94 is shaped so that the width of the distal end portion 94t is acutely tapered toward the distal end thereof in a cross-section including the axis line of rotation of the bearing. The flexibility of the distal end portion 94t of the sub-seal lip 94 can be improved by forming the distal end portion 94t into a tapered shape. Thus, the adhesiveness between the distal end portion 94t of the sub-seal lip 94 and the slinger 10 can be enhanced. In the configuration illustrated in FIG. 3, the entire sub-seal lip 94 is formed into a wedge-like shape adapted so that the thickness of the sub-seal lip is continuously reduced toward the distal end at the slide-contact side end from the base end side at which the distal end portion 94t is inclined away from the axial substrate surface 8b. The lip thickness of the base end portion of the sub-seal lip 94 is large. This can prevent occurrence of the problem that the sub-seal lip 94 is radially reversed in assembling the device. In addition, the aforementioned effect obtained by tapering the distal end portion of the sub-seal lip can simultaneously be achieved. Incidentally, as illustrated in FIGS. 11 and 12, at least at the side of the base end of the sub-seal lip 94, a predetermined segment portion extending toward the distal end portion of the sub-seal lip 94 can be formed so that the lip thickness thereof is constant. FIG. 11 illustrates an example of forming the predetermined segment portion, which includes the distal end portion of the sub-seal lip, so that the lip thickness is uniform. FIG. 12 illustrates an example of tapering the distal end portion of the lip.

Figure 9:
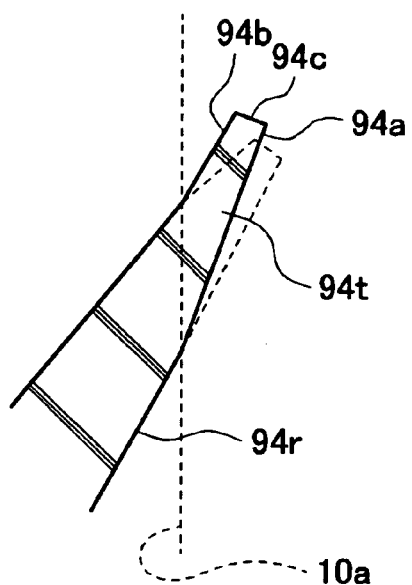
FIG. 9 is an enlarged cross-sectional view illustrating an example of modification of a sub-seal lip that is preliminarily bend-formed.
Figure 10:
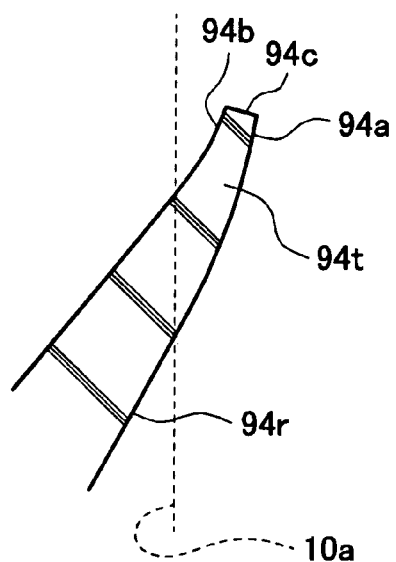
FIG. 10 is an enlarged view illustrating a distal end part of modification of a sub-seal lip that is preliminarily curve-formed.

Further, as illustrated in an upper part of FIG. 3, the sub-seal lip 94 is configured so as to form the outline in the non-deformed state like a straight line such that an acute-side angle φ1 of intersection between the outline indicating the radial inner circumferential surface 94a and the axial base surface 8b is smaller than an acute-side angle φ2 of intersection between the outline indicating the radial outer circumferential surface and the axial base surface 8b. Incidentally, in order to adjust the exposed thread at the distal end portion of the sub-seal lip, the entire sub-seal lip 94 or the distal end portion 94t can be formed into a shape in which the sub-seal lip 94 or the distal end portion 94t is flexed toward the radially inner circumferential surface 94a at the side at which the sub-seal lip 94 or the distal end portion 94t abuts against the slinger 10, as illustrated in FIG. 9. Alternatively, the sub-seal lip 94 or the distal end portion 94t can be formed into a preliminarily curved shape so as to expand toward the radially inner circumferential surface 94a, as illustrated in FIG. 10.

Second Embodiment

Next, a second embodiment of the invention is described below with reference to FIGS. 13 to 17. The second embodiment differs from the first embodiment mainly in the configuration of the sub-seal lip. Thus, the following description centers on the configuration of the sub-seal lip. Each component common to the first and second embodiments is designated with the same reference numeral. The description of such components is omitted.

Figure 13:
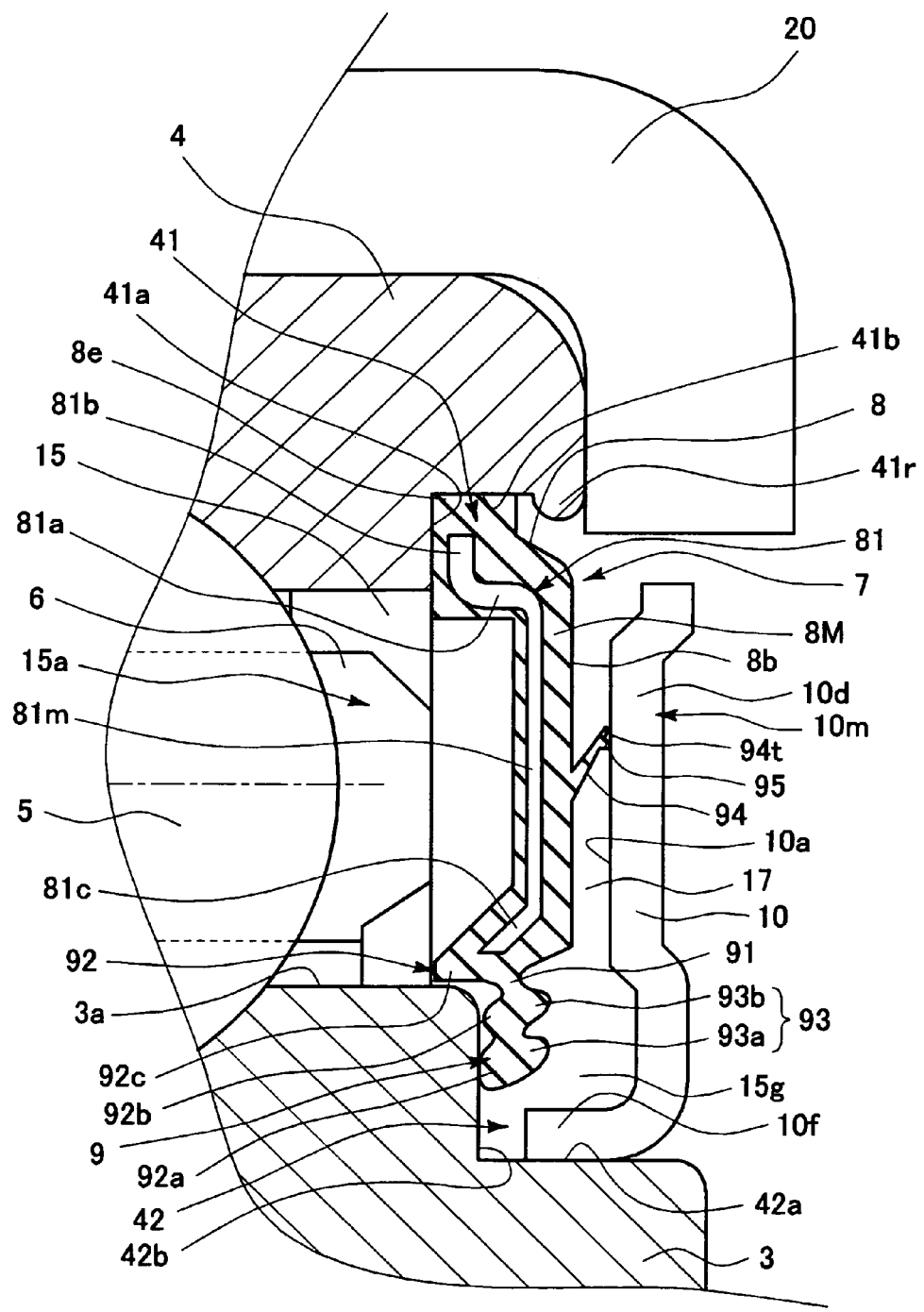
FIG. 13 is an enlarged cross-sectional view illustrating a sealing device portion for a bearing according to a second embodiment of the invention.
Figure 14:
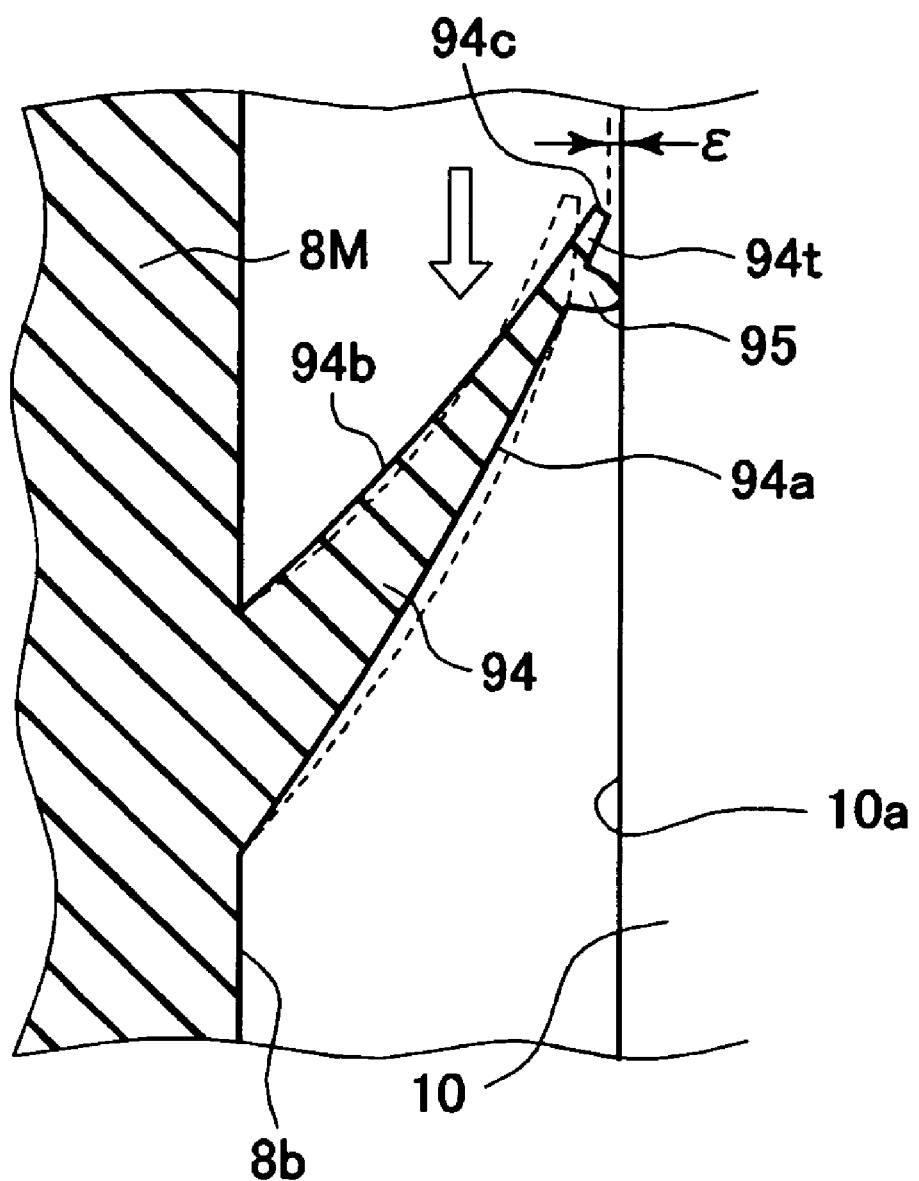
FIG. 14 is an enlarged cross-sectional view illustrating a sub-seal lip of the sealing device for a bearing illustrating in FIG. 13.

FIG. 13 is an enlarged cross-sectional view illustrating a sealing device portion for a bearing according to a second embodiment of the invention. FIG. 14 is an enlarged cross-sectional view illustrating a sub-seal lip of the sealing device for a bearing illustrating in FIG. 13.

Figure 15:
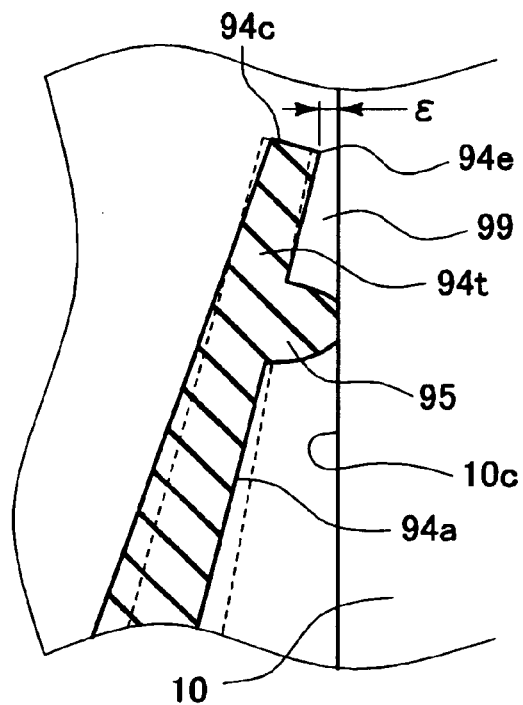
FIG. 15 is a further-enlarged cross-sectional view illustrating the neighborhood of a distal end portion of the sub-seal lip.

As illustrated in FIG. 15, an annular branch seal lip 95 is formed at a radially midway position on the inner circumferential surface of the sub-seal lip 94 so as to protrude toward the inner surface of the slinger 10. In a case where the outer ring 4 is in a non-rotating state, a distal end of the branch seal lip 95 is slide-contacted with the inner surface of the slinger 10. On the other hand, a radially inner circumferential surface of the distal end portion 94t of the sub-seal lip is positioned closer to the side of the radially distal end than the branch seal lip 95 of the sub-seal lip 94 such that the distance between the inner surface of the slinger 10 and the radially inner circumferential surface of the distal end portion 94t is gradually reduced toward the distal end of the sub-seal lip 94. As illustrated in FIG. 15, the distal end portion 94t of the sub-seal lip 94 is configured so that a clearance ε constituting a labyrinth seal is formed between the radially inner circumferential end edge of the distal end portion 94t of the sub-seal lip and the inner surface of the slinger 10.

When the outer ring 4 is in a non-rotating state, the distal end portion 94t of the sub-seal lip 94 has been non-contacted with the slinger 10. Even when the outer ring 4 is put into a rotating state, the sub-seal lip 94 is inclined toward the axial base surface 8b, i.e., in a direction in which the sub-seal lip 94 is inclined away from the slinger 10, as indicated by dashed lines in FIG. 15, so that the sub-seal lip 94 is deformed. Accordingly, the distal end portion 94t is not put into a state in which the distal end portion 94t and the slinger 10 slide with each other. On the other hand, the annular branch seal lip 95 is formed on the radially inner circumferential surface of the sub-seal lip 94 so as to protrude toward the inner surface of the slinger 10. The distal end of the branch seal lip 95 constitutes a linear slide contact surface against the slinger 10. When the rotation speed of the outer ring 4 is reduced, the axial exposed thread of the branch seal lip 95 is increased. However, as indicated by solid lines in FIG. 15, the distal end portion 94t of the sub-seal lip 94 maintains a state in which the distal end portion 94t is non-contacted with the slinger 10. Thus, a lip slide contact area is difficult to be excessively large. Consequently, occurrence of a stick-slip phenomenon can effectively be restrained.

Further, even when water drops or the like run through the branch seal lip 95 and infiltrate into the main seal lip 9 (see FIG. 13), the outer ring 4 is put into a rotating state. The centrifugal force thereof can quickly discharge water drops out of the sub-seal lip 94 through the branch seal lip 95 whose axial exposed thread is reduced, and the distal end portion 94t which has been in a non-contacted state.

Figure 16:
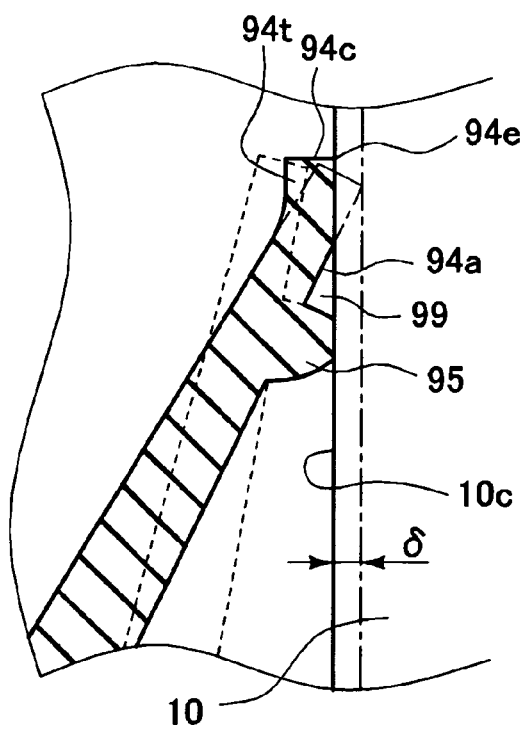
FIG. 16 is a cross-sectional view illustrating an example of modification of the sub-seal lip whose distal end portion is caused to abut against a slinger.

Referring next to FIG. 16, an example is shown, in which the radial inner circumferential distal edge of the distal end portion 94t of the sub-seal lip 94 is slide-contacted with the inner surface of the slinger 10, together with the branch seal lip 95, across a groove 99 formed by the radial inner circumferential surface and the radial outer circumferential surface of the branch seal lip 95. The sub-seal lip 94 is such that a slide contact edge 94e is formed at a position at which the distal end surface 94c of the distal end portion 94t of the sub-seal lip 94 and the radial inner circumferential surface 94a intersect with each other. The position of the distal end of the sub-seal lip 94 in the virtual non-deformed state in which the slinger 10 is omitted is indicated by an alternate long and short dash line in FIG. 16. In the actual bearing in an assembled state, the sub-seal lip 94 is made by the slinger 10 to be always in an elastically deformed condition in the non-rotating state of the bearing. However, the shape of the sub-seal lip 94 in the non-deformed state can be confirmed with removal of the slinger 10.

The slide contact edge 94e is placed outwardly from the position of the inner surface 10a of the slinger 10 by a certain distance in an axial direction in the non-deformed state (simultaneously in the non-rotating state of the bearing). An amount of axial extension of the slide contact edge 94e from the inner surface of the slinger 10 in the case of estimating in the non-deformed state determines an axial exposed thread 5 of the distal end portion 94t of the sub-seal lip 94 in the non-rotating state in which the outer ring 4 is not rotate (simultaneously, the negative pressure is 0). The distal end portion 94t of the sub-seal lip 94 abuts against the inner surface 10a of the slinger 10 by being elastically deformed while forming the annular band-like slide contact surface 94a' on the radially inner circumferential surface 94a by employing the slide contact edge 94e as a side at which the abutment of the distal end portion is started. On the other hand, the distal end surface 94c of the distal end portion 94t does not abut against the slinger 10. Incidentally, the distal end surface 94c is formed to be a flat surface. The aforementioned slide contact edge 94e is sharpened while appropriate stiffness is maintained. This contributes to the enhanced sealing property employing line contact.

Figure 17:
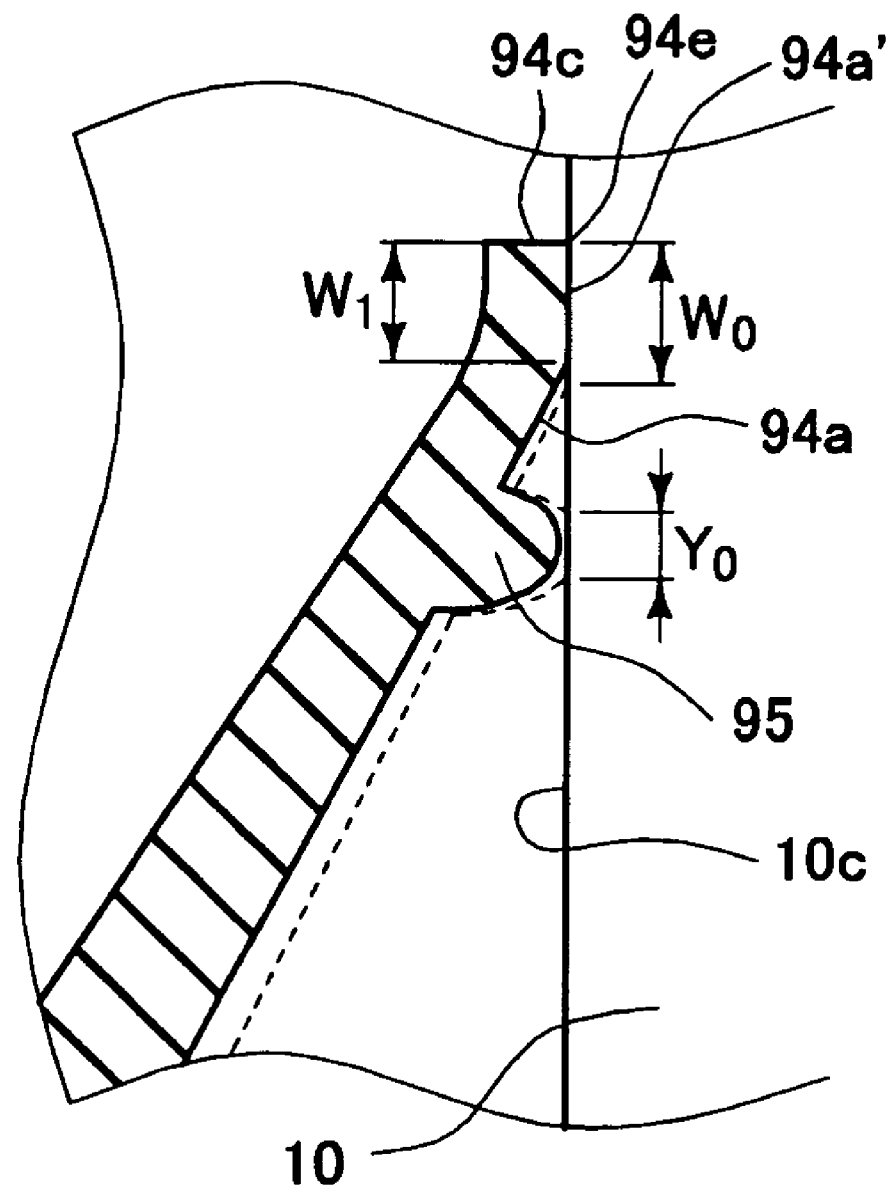
FIG. 17 is an explanatory view illustrating an operation of the sub-seal lip of a configuration illustrated in FIG. 16.

When a centrifugal force generated by the rotation of the outer ring 4 acts on the sub-seal lip 94, the sub-seal lip 94 is radially outwardly and elastically deformed, that is, deformed so as to be inclined toward the axial base surface 8b (see FIG. 14), as illustrated in FIG. 17. The larger the centrifugal force becomes, an amount of inclination of the sub-seal lip 94 increases. The axial exposed thread 8 is reduced with increase in the amount of inclination of the sub-seal lip 94. Then, the radially inner circumferential surface 94a of the distal end portion 94t is radially turned out from a side opposite to the slide contact edge 94e while the position, at which the slide contact edge 94e abuts against the inner surface 10c, is substantially maintained. The larger the centrifugal force becomes, the annular band-like slide contact surface 94a' formed on the slinger 10 is reduced in the radial width W toward the slide-contact edge 94e. That is, the radial width W0 of the slide contact surface 94a' in a state, in which the outer ring 4 is not rotated, and the radial width W1 thereof in a state, in which the outer ring 4 is rotated and in which the centrifugal force acts, meet the following condition: W1<W0. Consequently, the sub-seal lip 94 implements the function of self-controlling the sealing property and the running torque of the bearing according to the rotation speed of the outer ring 4. That is, the slide contact surface 94a' of the sub-seal lip 94 is formed like an annular band. As the rotation speed of the outer ring 4 increases, the width of the slide contact surface 94a' is radially reduced due to the centrifugal force due to the rotation of the outer ring 4. Consequently, sliding friction can effectively be minimized. The torque of the bearing is prevented from increasing at high-speed rotation.

Even when the centrifugal force increases somewhat, only reduction in the width of the slide contact surface 94a' is caused. However, the sub-seal lip 94 can maintain a slide-contacted state. The problem of the floating-up of the sub-seal lip 94 from the slinger 10 is difficult to occur. Further, as illustrated in FIG. 16, the sub-seal lip 94 is put into line contact with the inner surface of the slinger from a slide contact edge 94e formed in the boundary between the distal end surface 94c and the radially inner circumferential surface 94a thereof, instead of bringing the sub-seal lip 94 into plane contact with the inner surface of the slinger in the direction of a normal line thereto from a distal end portion thereof. Thus, the annular band-like slide contact surface 94a' is formed while the sub-seal lip 94 is elastically deformed. Consequently, even when the width of the slide contact surface 94a' is somewhat reduced due to the centrifugal force, the sealing ability is difficult to be impaired.

On the other hand, when the rotation speed of the outer ring 4 decreases to thereby reduce the centrifugal force acting on the sub-seal lip 94, the axial exposed thread of the distal end portion 94t increases, so that the width of the slide contact surface 94a' increases, and that the sealing property is enhanced. Further, the formation of the aforementioned annular groove 99 between the branch seal lip 95 and the distal end portion 94t of the sub-seal lip 94 causes the branch seal lip 95 to function as a limiter for restricting increase in the width of the slide contact surface. Consequently, occurrence of a stick-slip phenomenon is restrained. Further, the distal end portion 94t of the sub-seal lip 94 and the branch seal lip 95 radially constitute a type of a two-stage seal. For example, even in a case where a vehicle runs while being submerged in a river, occurrence of the problem of filtration of water filled around the bearing thereinto can extremely effectively be prevented.

Next, in cases where the internal pressure of the rolling element arranging space 15 is negative, and where the exposed thread δ is set at a large value, the sub-seal lip 94 is deformed radially inwardly (i.e., in a direction in which the sub-seal lip 94 is pushed against the slinger 10), as indicated by dashed lines in FIG. 16. In this case, the exposed thread of the branch seal lip 95 increases. However, the distal end portion 94t of the sub-seal lip 94 swings with respect to the inner surface of the slinger 10 in a direction, in which the distal end portion 94t goes away from the inner surface of the inner-ring-side 10 as the negative pressure acting on the sub-seal lip 94 increases; by employing the branch seal lip 95 as a fulcrum point. Consequently, the axial exposed thread of the distal end portion 94t of the sub-seal lip 94 at the time of causing the negative pressure to act is reduced by the swinging motion of the distal end portion 94t. Accordingly, a stick-slip phenomenon is difficult to occur.

Third Embodiment

Next, a third embodiment of the invention is described below with reference to FIGS. 18 to 22. The third embodiment differs from the first embodiment mainly in the configuration of each of the sub-seal lip and the slinger. Thus, the following description centers on the configuration of the sub-seal lip and the slinger. Each component common to the first and third embodiments is designated with the same reference numeral. The description of such components is omitted.

Figure 18:
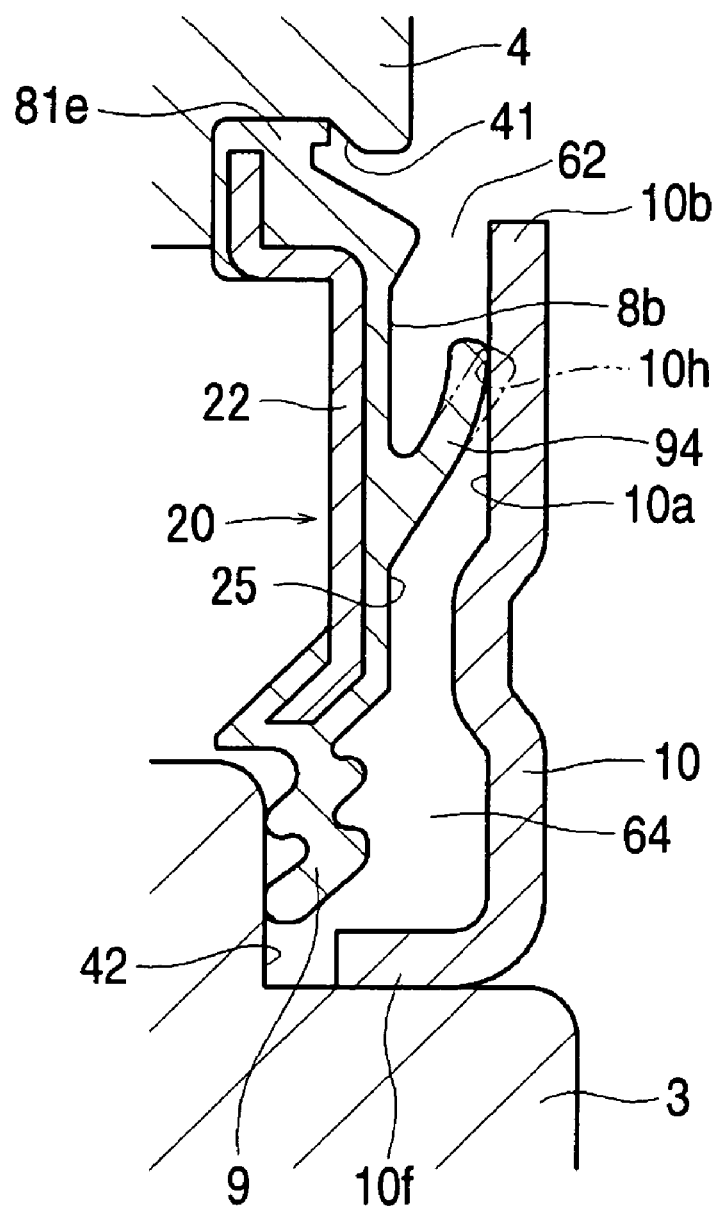
FIG. 18 is an enlarged view illustrating a portion relating to a sealing device for a rolling bearing according to a third embodiment of the invention.

As illustrated in FIG. 18, a conical sub-seal lip 94, whose diameter is increased toward the outer side of the bearing in a state, in which the sliding seal portion 8 is not mounted in the rolling bearing 1, as indicated by imaginary lines in FIG. 18, is formed at a radially central portion of the axial base surface 8b of the sliding seal portion 8, which faces the slinger 10, at the outer side of the bearing. Further, in a state in which the sliding seal portion 8 is mounted in the rolling bearing 1, the distal end portion of the sub-seal lip 94 is deformed to be flat, as indicated by solid lines in FIG. 18. Further, the sub-seal lip 94 is contacted with the inner surface 10a of the sub-seal lip 94, which is placed at the inner side of the bearing, in a state in which a predetermined exposed thread is set, and in which the sub-seal lip 94 is pressurized. Incidentally, the distal end of the sub-seal lip 94 and the inner surface 10a of the slinger 10 are brought into slight contact with each other in order to allow the relative rotation between the sliding seal portion 8 and the slinger 10.

Figure 19:
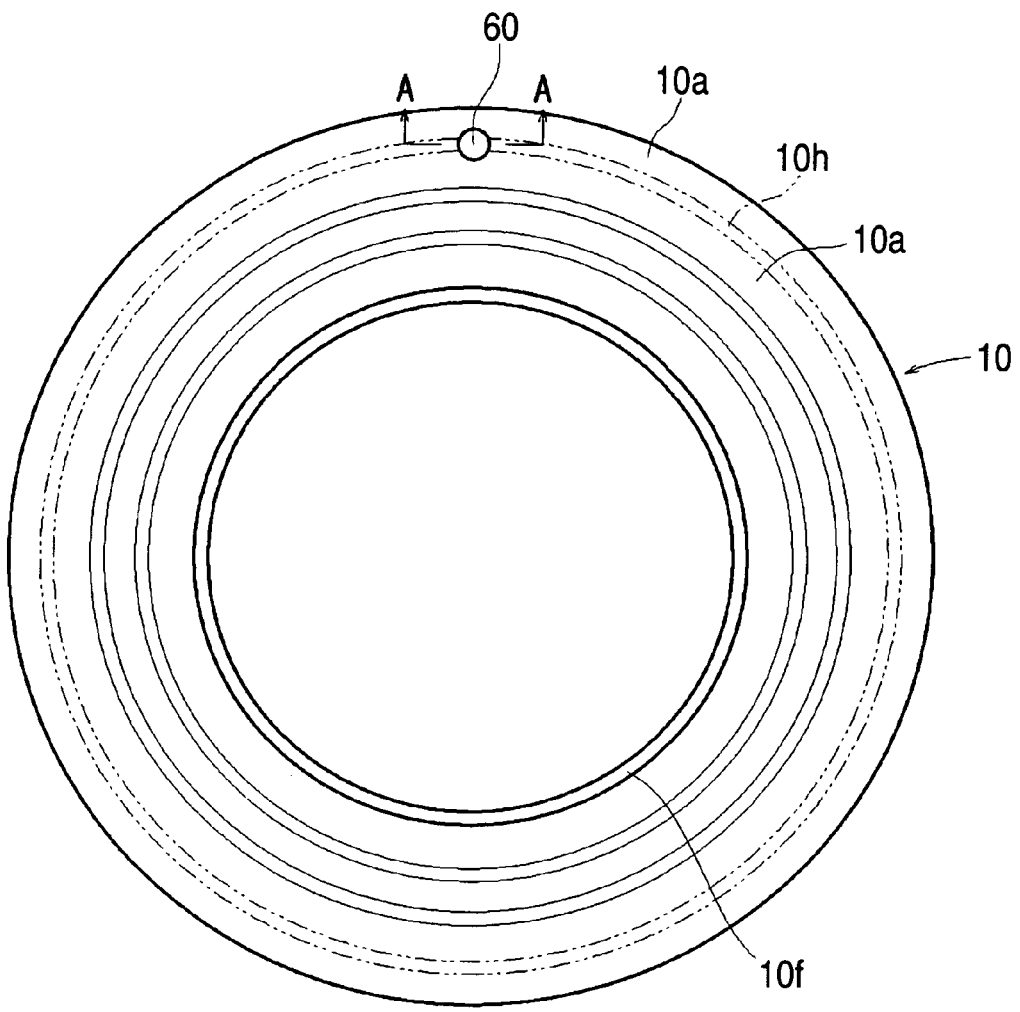
FIG. 19 is a plan view illustrating the inside of a slinger according to an embodiment of the invention.

FIG. 19 is a plan view illustrating the inside of the bearing of the slinger 10. The slinger 10 is an annular metal plate formed by press-working. Further, as illustrated in FIG. 18, a circumferential end of the slinger 10 is bent like a cylinder toward the inner side of the rolling bearing 1 to thereby form a cylindrical portion 10f. The cylindrical portion 10f is press-fit into an outside-diameter-side of the inner ring 3. Thus, the slinger 10 is fixed to the inner ring 3. Further, a clearance is provided between a distal end portion 10b at an end of the outside-diameter-side of the slinger 10 and the outer ring 4. Consequently, an opening portion 62 opened toward the outside of the bearing is formed.

Furthermore, as illustrated in FIG. 18, an end of the sub-seal lip 94 of the sliding seal portion 8 is contacted with the inner surface 10a of the slinger 10, which is placed at the inner side of the bearing, to thereby block up the clearance between the sliding seal portion 8 and the slinger 10. A sealed area 64 surrounded by the sliding seal portion 8 and the slinger 10 is formed at the inside-diameter-side more inwardly from the sub-seal lip 94 by being obstructed by the sub-seal lip 94.

Figure 20:
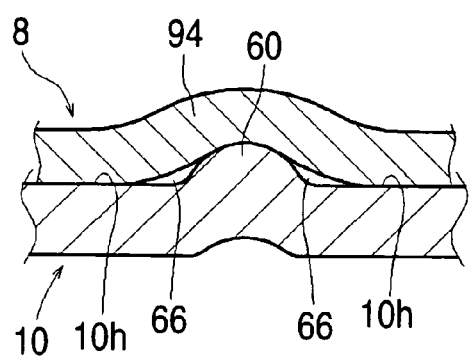
FIG. 20 is a partial cross-sectional view which is taken in a position A-A illustrated in FIG. 19 and which illustrates a sliding seal portion and a slinger.

Then, as illustrated in FIG. 19, a hemispherical protrusion 60 is formed on an annular seal sliding surface 10h on which a distal end of the sub-seal lip 94 of the sliding seal portion 8 slides in the inner surface 10a of the slinger 10 at the inner side of the bearing. FIG. 20 is a partial cross-sectional view which is taken on a position A-A shown in FIG. 21, and which illustrates the sub-seal lip 94 of the sliding seal portion 8 and the slinger 10. As illustrated in FIG. 20, an airflow path 66 extending from the inside diameter side to the outside diameter side of the sub-seal lip 94 is formed between the sub-seal lip 94 and a seal sliding surface 10h of the slinger 10 in the circumferential vicinity of the position at which the distal end of the sub-seal lip 94 slides on the protrusion 60. Thus, in the sealed area 64, an air hole is formed in the periphery of the protrusion 60 of the slinger 10. Accordingly, the sealed area 64 is configured to communicate with outside air.

Figure 21:
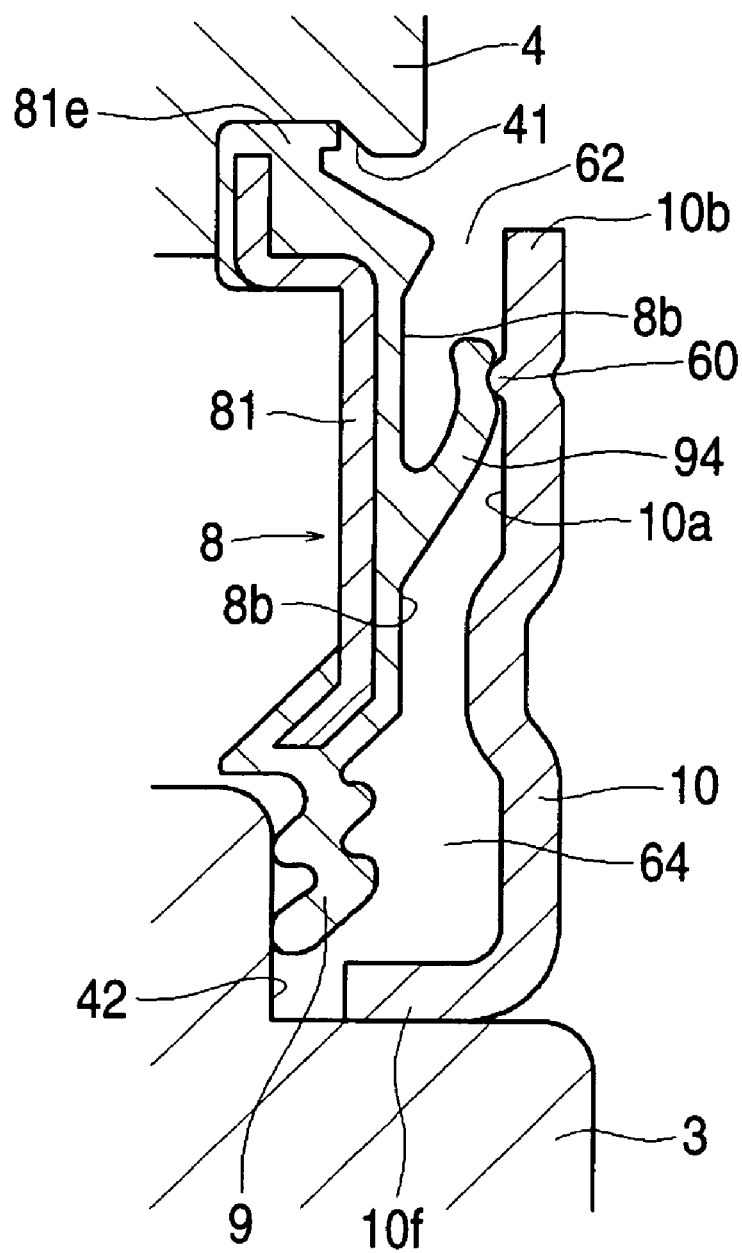
FIG. 21 is a partial cross-sectional view that illustrates a part of a rolling bearing, which is parallel to a shaft, and that is taken in a position, at which a protrusion is formed on a slinger.

FIG. 21 is a partial cross-sectional view that illustrates a part of the rolling bearing 1, which is parallel to a shaft, and that is taken in a position, at which the protrusion 60 is formed on the slinger 10. The sub-seal lip 94 of the sliding seal portion 8 is sprang onto the protrusion 60 and is separated from the inner surface 10a of the slinger 10. Further, the airflow path 66 is formed between the sub-seal lip 94 and the slinger 10 so as to extend in a front-back direction of paper on which FIG. 21 is drawn.

In the present embodiment, the inner ring 3 does not rotate. Thus, the position of the protrusion 60 of the slinger 10 fixed to the inner ring 3 does not change. The rolling bearing 1 is attached to the shaft such that the protrusion 60 is located below the rolling bearing 1. Thus, water is prevented from infiltrating, when the water is splashed on the bearing 1, into the bearing 1 from the periphery of the protrusion 60.

Incidentally, a plurality of protrusions 60 can be formed on the seal sliding surface 10h of the slinger 10.

Next, the function of an example of the present embodiment of the invention is described below.

In the rolling bearing 1, the sliding seal portion 8 fixed to the outer ring 4 rotates at high speed due to the high-speed rotation of the bearing 1. Also, the main seal lip 9 and the sub-seal lip 94 rotate at high speed. Then, air in the sealed area 64 is heated by heat generated due to the sliding motion of the main seal lip 9 on the inner ring 3 and that of the sub-seal lip 94 on the slinger 10. Thus, the internal pressure of the sealed area 64 becomes higher than the atmosphere pressure.

Incidentally, when the sliding seat portion 8 rotates at high speed, a distal end of a part of the sub-seal lip 94, which hits the protrusion 60 of the slinger 10, is sprang up by the protrusion 60 due to the rotation of the sliding seal 8. Then, as illustrated in FIG. 20, the airflow path 66 extending from the inside-diameter-side of the sub-seal lip 94 to the outside-diameter-side thereof is formed between the protrusion 60 and the sub-seal lip 94 in the circumferential vicinity of the protrusion 60. Thus, air in the sealed area 64 leaks out of the airflow path 66 provided in the periphery of the position, at which the sub-seal lip 94 slides on the protrusion 60, to the outside-diameter side of the sub-seal lip 94. The difference in pressure between the air in the sealed area 64 and the atmospheric air can be eliminated.

When water is splashed on the slinger 10 in a state in which the temperature of the sealed area 64 is high, thereby to cool the sealed area 64 and to make the internal pressure of the sealed area 64 lower than the atmospheric pressure, ambient air flows into the sealed area 64 from the airflow path 66 provided in the periphery of the position at which the sub-seal lip 94 slides on the protrusion 60 of the slinger 10. Consequently, the difference in pressure between the air in the sealed area 64 and the atmospheric air can be eliminated.

Similarly, in the case where, after air in the sealed area 64 is heated by causing the bearing 1 to rotate at high speed, the air in the sealed area is naturally cooled while the bearing 1 stops rotating, so that the pressure of the air in the sealed area 64 becomes lower than the atmospheric pressure, outside air flows into the sealed area 64 through the airflow path 66 provided in the periphery of the position at which the sub-seal lip 94 is in contact with the protrusion 60 of the slinger 10. The difference in pressure between the air in the sealed area 64 and the atmospheric air can be eliminated.

Thus, occurrence of a negative pressure in the inside of the bearing, which is shielded by the sub-seal lip, can be prevented by providing the protrusion on the sliding surface of the slinger, on which the sub-seal lip slides, without significant change of design of the bearing. In addition, the sliding seal portion can be prevented from being sucked. Consequently, torque can be prevented from being increased by the sub-seal lip.

Further, in a case where the slinger is formed by performing press-working on a steel sheet, similarly to the above embodiment, the protrusion can be processed simultaneously with the formation thereof by the press-working. Thus, when the protrusion is provided, the cost is hardly increased.

In the above embodiment, the protrusion provided on the inner surface 10a of the slinger 10 is formed like a hemisphere. However, the shape of the protrusion 60 is not limited thereto. The protrusion 80 can be formed into a shape in which each semicircular cross-section extends radially.

Figure 22A:
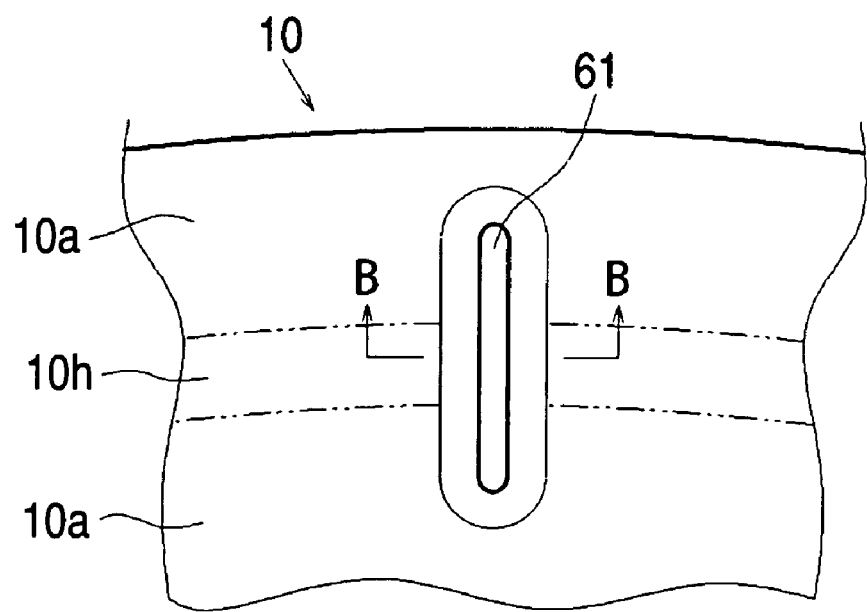
FIG. 22A is a partial plan view illustrating the inside of a bearing of a slinger of a modified embodiment of the invention.
Figure 22B:
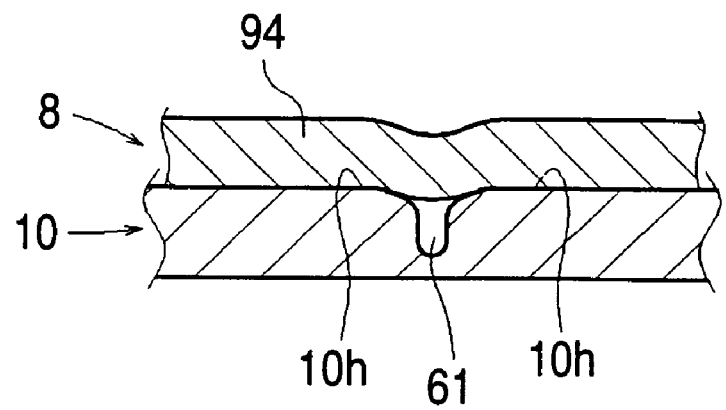
FIG. 22B is a partial cross-sectional view that is taken in a position B-B illustrated in FIG. 22A and that illustrates a sliding seal portion and a slinger.

Further, although the above embodiment is configured such that the protrusion 60 is provided on the slinger 10, the device can be constructed such that a ventilating groove 61 for air vent is provided in the inner surface 10a of the slinger 10 so as to have a radial length that exceeds the width of the seal sliding surface 10h. FIG. 22A is a partial plan view illustrating the slinger 10 provided with the ventilating groove 61 in the bearing as an example of modification of the embodiment. FIG. 22B is a partially cross-sectional view illustrating the sub-seal lip 94 of the sliding seal portion 8 and the slinger 10 at a position B-B shown in FIG. 22A. Incidentally, the ventilating groove 61 is shaped so as not to be blocked up by the sub-seal lip 94. Additionally, a plurality of ventilating grooves 61 can be formed.

In the above embodiment, a slinger fit onto the inner ring is used as the slinger on which the main seal lip slides. However, the slinger can be a shield plate whose inner circumference is fixed directly to the shaft.

Further, in the foregoing description of the embodiment, an example of applying the invention to a double row deep groove ball bearing of the outer ring rotation type has been described. However, the invention can be applied to general rolling bearings of either the outer ring rotation type or the inner ring rotation type each provided with a sliding seal portion and a slinger for sealing, which perform relative rotation.

In addition, a sealing device for a rolling bearing according to the invention can be implemented in various modes within the scope of the idea of the invention.

Fourth Embodiment

Next, a fourth embodiment of the invention is described below with reference to FIGS. 23 and 24. The fourth embodiment differs from the first embodiment mainly in the configuration of the sub-seal lip. Thus, the following description centers on the configuration of the sub-seal lip. Each component common to the first and fourth embodiments is designated with the same reference numeral. The description of such components is omitted.

Figure 23:
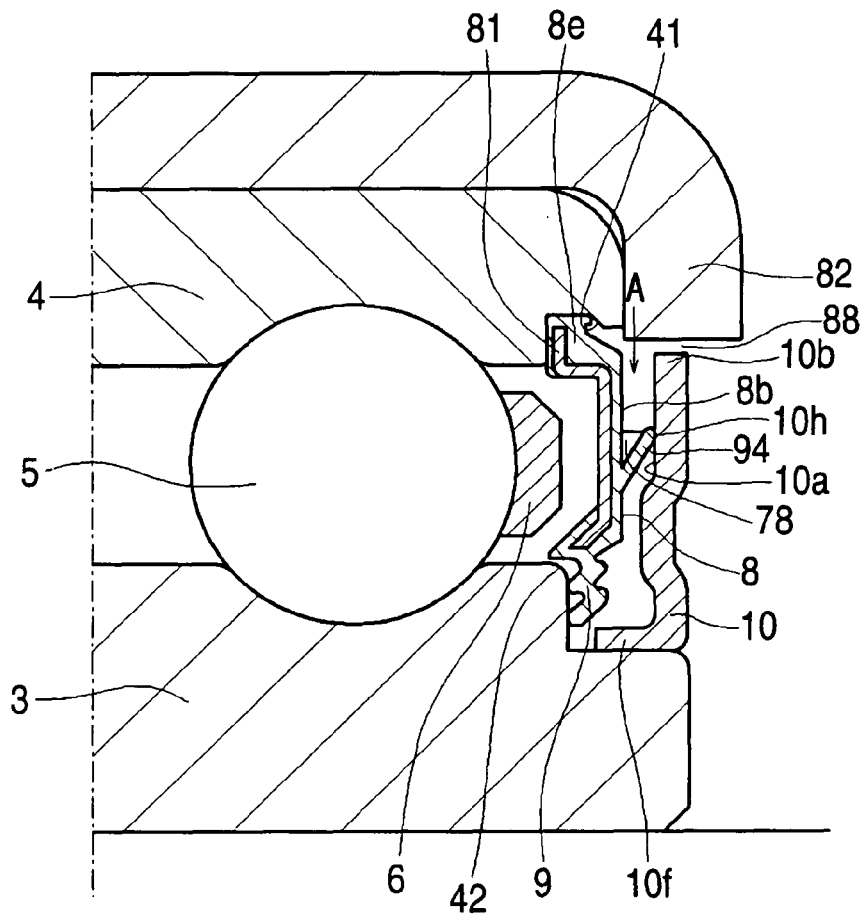
FIG. 23 is an enlarged view illustrating a portion relating to a sealing device for a rolling bearing according to a fourth embodiment of the invention.

Further, as illustrated in FIG. 23, a conical sub-seal lip 94, whose diameter is increased toward the outer side of the bearing, is formed at a radially central portion of the axial base surface 8b of the sliding seal portion 8, which faces the slinger 10, at the outer side of the bearing. Further, the sliding surface 10h at the distal end of the sub-seal lip 94 is contacted with the inner surface 10a of the slinger 10, which is placed at the inner side of the bearing. Incidentally, the sliding surface 10h of the sub-seal lip 94 and the inner surface 10a of the slinger 10 are brought into slight contact with each other in order to allow the relative rotation between the sliding seal portion 8 and the slinger 10. Furthermore, in the base portion of the sub-seal lip 94, which faces the axial base surface 8b of the sliding seal portion 8, eight triangular plate-like fins 78 are formed at uniform intervals so as to be circumferentially separated from one another and as to extend between the axial base surface 8b of the sliding seal portion 8 and the sub-seal lip 94. Incidentally, the interval between and the number of the fins 78 can appropriately be changed.

Figure 24:
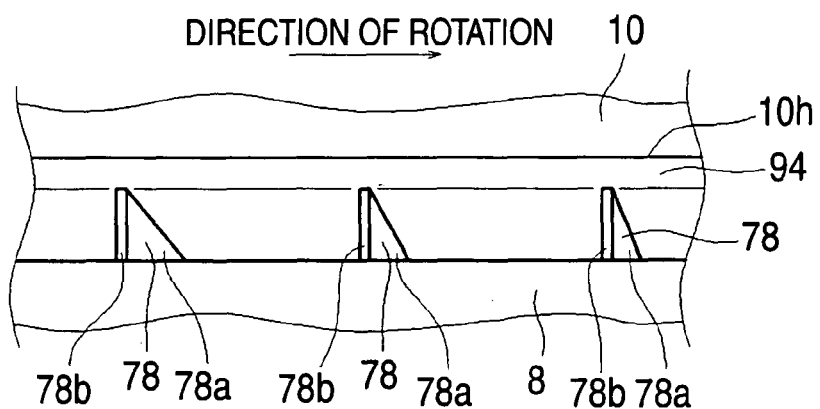
FIG. 24 is a view taken in the direction of arrow A illustrated in FIG. 23.

FIG. 24 is a view taken in the direction of arrow A illustrated in FIG. 23. As illustrated in FIG. 24, the fins 78 are formed so as to be inclined to the radial direction. The inside-diameter-side base portion 78a of each fin 78 is provided at the front side in the direction of rotation of the sliding seal portion 8. The outside-diameter-side distal end portion 78b of each fin 78 is provided at the rear side in the direction of rotation of the sliding seal portion 8.

As illustrated in FIG. 23, the slinger 10 is an annular metal plate. A circumferential end of the slinger 10 is bent like a cylinder toward the inner side of the rolling bearing 1 to thereby form a cylindrical portion 10f. The cylindrical portion 10f is press-fit into the outside-diameter-side of the inner ring 3. Thus, the slinger 10 is fixed to the inner ring 3. Further, a clearance is provided between the distal end portion 10b at an end of the outer circumference of the slinger 10 and an end surface of a flange 42 of the idler pulley 20. Consequently, an opening portion 88 is formed so as to be opened toward the outside of the bearing. Furthermore, as described above, the sliding surface 10h of the sub-seal lip 94 of the sliding seal portion 8 is contacted with the inner surface 10a of the slinger 10, which is placed at the inner side of the bearing, to thereby block up the clearance between the sliding seal portion 8 and the slinger 10.

Next, the function of the sealing device for a rolling bearing according to an example of the present embodiment is described below.

In the rolling bearing 1, the sliding surface 10h of the distal end portion of the sub-seal lip 94 formed on the axial base surface 8b, which faces the slinger 10 of the sliding seal portion 8, is contacted with the inner surface 10a of the slinger 10, which is provided at the inner side of the bearing, thereby blocking up the clearance between the sliding seal portion 8 and the slinger 10. Thus, foreign materials, such as water and dust, entering between the sliding seal portion 8 and the slinger 10 from the outside-diameter-side opening portion 88 are restrained from infiltrating into the vicinity of the seal lip 94 which is provided at the inside-diameter side of the bearing.

Incidentally, the sliding seal portion 8 is fixed to the outer ring 4 and rotates together with the outer ring 4. Thus, the plate-like fins 78 are formed at the base portion of the sub-seal lip 94, which is connected to the axial base surface 8b of the sliding seal portion 8, so as to be circumferentially separated from one another and as to extend between the axial base surface 8b of the sliding seal portion 8 and the sub-seal lip 94. Consequently, air being present between the sliding seal portion 8 and the slinger 10 is sent radially outwardly by the action of rotation of each fin 78 due to the rotation of the sliding seal portion 8. Further, foreign materials in the air are sent radially outwardly by an inertia force due to the rotation and are discharged out of the bearing. In addition, the air is sent radially outwardly therefrom. Thus, the pressure of the air being present between the sliding seal portion 8 and the slinger 10 becomes higher than the atmospheric pressure. Consequently, a pressure difference is generated between the inside and the outside of the opening portion 88 formed at the distal end portion 10b of the slinger 10. Accordingly, foreign materials, such as water and dust, are restrained from entering between the sliding seal portion 8 and the slinger 10 from the outside of the bearing.

However, in environment in which a large amount of water is splashed on the bearing 1, sometimes, water enters the clearance between the sliding seal portion 8 and the slinger 10 from the outside-diameter-side opening portion 88. In such a case, foreign materials, such as water and dust, which enter the clearance between the sliding seal portion 8 and the sub-seal lip 94 and are stored in the groove between the axial base surface 8b and the sub-seal lip 94, are moved in a direction opposite to the direction of rotation of the sliding seal portion 8 by the inertia force due to the action of rotation of the sliding seal portion 8. Incidentally, the fins 78 are formed by being inclined toward the radial direction such that the rear in the direction of rotation of the sliding seal portion 8 is located at a radially outer side. Consequently; foreign materials are pushed radially outwardly along each fin 78 by the inertia force and are discharged to the outside of the bearing. Accordingly, in a case where the rolling bearing 1 is used in the environment in which a large amount of water is splashed on the bearing, water can effectively be discharged to the outside of the bearing.

Thus, in the sealing device for the rolling bearing 1, a difference in air pressure is caused between the inside and the outside of the opening portion 88 of the slinger 10 thereby to restrain Infiltration of foreign materials into the bearing 1. Further, foreign materials, such as water and dust, filtrated into between the sliding seal portion 8 and the slinger 10 is restrained from infiltrating into the vicinity of the main seal lip 9. In addition, foreign materials, such as water and dust, filtrated into between the sliding seal portion 8 and the slinger 10 can effectively be discharged. Consequently, the sealing ability of the rolling bearing can be enhanced. The reliability thereof can be more enhanced.

In the above embodiment, the sub-seal lip 94 is formed at the radially central portion of the axial base surface 8b of the sliding seal portion 8. However, the position at which the sub-seal lip 94 is formed is not limited to the radially central portion of the axial base surface 8b of the sliding seal portion 8. Further, the shape of the sub-seal lip 94 is not limited to a conical shape. The sub-seal lip 94 can be shaped so that a part thereof, which is close to the base thereof connected to the axial base surface 8b, is cylindrical, and that the diameter thereof increases toward a distal end thereof.

In the above embodiment, each fin 78 is inclined to the radial direction. However, the direction of each fin 78 can be a radial direction lined up with the direction of a radius thereof. In a case where the direction of each fin 78 is set to be a radial direction, portions respectively having negative angles with respect to, e.g., a demolding direction are reduced. Consequently, the molding of the sliding seal portion 8 is facilitated.

In the above embodiment, a clearance is formed between the distal end portion 10b of the slinger 10 and the flange 42 of the pulley 20. However, the device can be configured such that the outer ring 4 is substantially equal in width to the inner ring 3, and that a clearance is formed between the distal end portion 10b of the slinger 10 and the inner surface of the outer ring 4.

Further, in the aforementioned embodiment, the slinger 10 is fixed to the inner ring 3 by being press-fit thereinto. However, the slinger 10 can be configured such that an end thereof at the side of the inner ring 3 is supported by being surrounded with a snap ring fixed to the axial base surface and the shaft of the inner ring 3.

In the foregoing description of the embodiment, an example of the double row deep groove ball bearing of the outer ring rotation type used in the idler pulley has been described. The use of the sealing device for a rolling bearing according to the invention is not limited to an idler pulley. In addition, the rolling bearing is not limited to a double row deep groove ball bearing. The sealing device for a rolling bearing according to the invention can be applied to general rolling bearings of the outer ring rotation type.

In addition, a sealing device for a rolling bearing according to the invention can be implemented in various modes within the scope of the idea of the invention.

What is claimed is:

1. A sealing device for a radial bearing including an inner ring, an outer ring and rolling elements interposed between the inner and outer rings, the sealing device comprising:
    a slinger which includes a radially inner circumferential edge portion fit to the inner ring and a body plate for axially obstructing an annular opening formed between the inner and outer rings; and
    a sliding seal portion which includes:
        an axial base surface facing the body plate of the slinger with forming an axial seal clearance between the axial base surface and the body plate at an axially inner side of the slinger;
        a radially outer circumferential edge which is formed at a radially outer end of the axial base surface and is fit to the outer ring;
        a main seal lip which is formed at a radially inner end of the axial base surface and is slide-contacted with an outer side of an axial end portion of the inner ring; and
        a sub-seal lip which extends from the axial base surface in the axial seal clearance so that a slide contact edge at a distal end portion of the sub-seal lip is slide-contacted with the body plate,
    wherein the sub-seal lip abuts against the inner surface of the body plate by being elastically deformed such that a slide contact area between the slide contact edge and the inner surface of the body plate has a substantially annular band shape;
    wherein the sub-seal lip is elastically deformed so as to be inclined toward the axial base surface by a centrifugal force generated due to rotation of the outer ring, and
    wherein a radial width of the annular band shape of the slide contact area is reduced towards the slide contact edge with increase in the centrifugal force.

2. The sealing device according to claim 1, wherein a lip length determined as a dimension to the slide contact edge from a starting position of inclination of the lip is larger than a lip base end thickness determined as a radial dimension of an intersection surface between the sub-seal lip and the axial base surface.

3. The sealing device according to claim 1, wherein the distal end portion of the sub-seal lip is formed so as to be at least one of a flat surface and a stepped shape.

4. The sealing device according to claim 1, wherein the distal end portion of the sub-seal lip is shaped so that a width of the distal end portion is acutely tapered toward the distal end of the sub-seal lip in a cross-section including an axis line of rotation of the bearing.

5. A sealing device for a radial bearing including an inner ring, an outer ring and rolling elements interposed between the inner and outer rings, the sealing device comprising:
    a slinger which includes a radially inner circumferential edge portion fit to the inner ring and a body plate for axially obstructing an annular opening formed between the inner and outer rings; and
    a sliding seal portion which includes:
        an axial base surface facing the body plate of the slinger with forming an axial seal clearance between the axial base surface and the body plate at an axially inner side of the slinger;
        a radially outer circumferential edge which is formed at a radially outer end of the axial base surface and is fit to the outer ring;
        a main seal lip which is formed at a radially inner end of the axial base surface and is slide-contacted with an outer side of an axial end portion of the inner ring; and
        a sub-seal lip which extends from the axial base surface in the axial seal clearance,
    wherein an annular branch seal lip is formed at a radially midway position on a radially inner circumferential surface of the sub-seal lip so as to protrude toward an inner surface of the slinger,
    wherein when in a non-rotating state of the outer ring, a distal end of the branch seal lip is slide-contacted with the inner surface of the body plate of the slinger, and a distance between the inner surface of the body plate and a radially inner circumferential surface of a distal end portion of the sub-seal lip is gradually reduced toward a distal end of the sub-seal lip, and
    wherein, in the non-rotating state of the outer ring, a clearance constituting a labyrinth seal is formed between the radially inner circumferential end edge of the distal end portion and the inner surface of the body plate.

6. The sealing device according to claim 5, wherein the annular branch seal lip is disposed such that a gap is formed between the distal end portion of the sub-seal lip and the inner surface of the body plate of the slinger.

7. The sealing device according to claim 5, wherein the branch seal lip is configured such that, when in a rotating state of the outer ring, a centrifugal force, generated due to rotation of the outer ring, reduces an axially exposed thread of the branch seal lip.

8. A sealing device for a radial bearing including an inner ring, an outer ring and rolling elements interposed between the inner and outer rings, the sealing device comprising:
    a slinger which includes a radially inner circumferential edge portion fit to the inner ring and a body plate for axially obstructing an annular opening formed between the inner and outer rings; and
    a sliding seal portion which includes:
        an axial base surface facing the body plate of the slinger with forming an axial seal clearance between the axial base surface and the body plate at an axially inner side of the slinger;
        a radially outer circumferential edge which is formed at a radially outer end of the axial base surface and is fit to the outer ring;
        a main seal lip which is formed at a radially inner end of the axial base surface and is slide-contacted with an outer side of an axial end portion of the inner ring; and
        a sub-seal lip which extends from the axial base surface in the axial seal clearance,
    wherein an annular branch seal lip is formed at a radially midway position on a radially inner circumferential surface of the sub-seal lip so as to protrude toward an inner surface of the slinger,
    wherein when in a non-rotating state of the outer ring, a distal end of the branch seal lip is slide-contacted with the inner surface of the body plate of the slinger, and a distance between the inner surface of the body plate and a radially inner circumferential surface of a distal end portion of the sub-seal lip is gradually reduced toward a distal end of the sub-seal lip, and wherein, in the non-rotating state of the outer ring, a distal end edge of the distal end portion of the sub-seal lip is slide-contacted with the inner surface of the slinger, together with the branch seal lip, across an annular groove formed by the radially inner circumferential surface and the radially outer circumferential surface of the branch seal lip.

9. The sealing device according to claim 8, wherein the sub-seal lip is elastically deformed in a radially inward direction due to a negative pressure generated at a space where the rolling elements are arranged, and wherein the distal end portion of the sub-seal lip approaches and moves apart from the inner surface of the body plate according to the negative pressure in a swinging manner using the branch seal lip as a fulcrum point.

10. The sealing device according to claim 8, wherein a slide contact edge which is slide-contacted with an axially inner surface of the body plate is formed at the distal end portion of the sub-seal lip, wherein the sub-seal lip abuts against the inner surface of the body plate by being elastically deformed such that a slide contact area between the slide contact edge and the inner surface of the body plate has a substantially annular band shape, wherein the sub-seal lip is elastically deformed so as to be inclined toward the axial base surface by a centrifugal force generated due to rotation of the outer ring, and wherein a radial width of the annular band shape of the slide contact area is reduced toward the slide contact edge with increase in the centrifugal force.

11. A sealing device for a radial bearing including an inner ring, an outer ring and rolling elements interposed between the inner and outer rings, the sealing device comprising:

a slinger which includes a radially inner circumferential edge portion fit to the inner ring and a body plate for axially obstructing an annular opening formed between the inner and outer rings; and a sliding seal portion which includes:

an axial base surface facing the body plate of the slinger with forming an axial seal clearance between the axial base surface and the body plate at an axially inner side of the slinger;

a radially outer circumferential edge which is formed at a radially outer end of the axial base surface and is fit to the outer ring;

a main seal lip which is formed at a radially inner end of the axial base surface and is slide-contacted with an outer side of an axial end portion of the inner ring; and a sub-seal lip which extends from the axial base surface in the axial seal clearance so that the sub-seal lip is slide-contacted with the body plate, wherein a protrusion or a concave groove is formed in a seal sliding surface of the slinger on which the sub-seal lip is slide-contacted.

12. A sealing device for a radial bearing including an inner ring, an outer ring and rolling elements interposed between the inner and outer rings, the sealing device comprising:

a slinger which includes a radially inner circumferential edge portion fit to the inner ring and a body plate for axially obstructing an annular opening formed between the inner and outer rings; and a sliding seal portion which includes:

an axial base surface facing the body plate of the slinger with forming an axial seal clearance between the axial base surface and the body plate at an axially inner side of the slinger;

a radially outer circumferential edge which is formed at a radially outer end of the axial base surface and is fit to an axial end portion of the outer ring;

a main seal lip which is formed at a radially inner end of the axial base surface and is slide-contacted with an outer side of an axial end portion of the inner ring; and a conical sub-seal lip which extend from the axial base surface in the axial seal clearance so that the sub-seal lip increases in diameter toward a radially outside of the bearing and a slide contact edge at a distal end portion of the sub-seal lip is slide-contacted with the body plate, wherein a plurality of plate-like fins are formed on a base portion of the sub-seal lip so as to be circumferentially spaced apart from one another and as to extend between the sub-seal lip and the axial base surface of the sliding seal portion, wherein air between the sliding seal portion and the slinger is radially outwardly sent out by action of rotation of each fin due to rotation of the sliding seal portion, and wherein a pressure of the air between the sliding seal portion and the slinger is made to be higher than a pressure of outside air so as to cause a pressure difference therebetween, thereby restraining a foreign material from infiltrating into between the sliding seal portion and the slinger from an exterior of the bearing.

13. The sealing device according to claim 12, wherein the fins are formed so as to be inclined with respect to a radial direction so that a foreign material entering between the axial base surface of the sliding seal portion and the sub-seal lip in response to a rotation of the sliding seal portion is discharged outwardly in a radial direction of the bearing.

* * * * *